US009684547B2

(12) United States Patent
Krstic et al.

(10) Patent No.: US 9,684,547 B2
(45) Date of Patent: Jun. 20, 2017

(54) METHOD AND APPARATUS FOR HANDLING SECURITY OF AN APPLICATION AND ITS EXTENSION

(71) Applicant: Apple Inc., Cupertino, CA (US)

(72) Inventors: Ivan Krstic, San Francisco, CA (US); Damien P. Sorresso, San Francisco, CA (US); Jason C. Beaver, San Jose, CA (US); Sophia Teutschler, San Jose, CA (US); Ian J. Baird, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/488,122

(22) Filed: Sep. 16, 2014

(65) Prior Publication Data

US 2015/0347748 A1 Dec. 3, 2015

Related U.S. Application Data

(60) Provisional application No. 62/004,777, filed on May 29, 2014, provisional application No. 62/004,778, (Continued)

(51) Int. Cl.
*H04L 29/06* (2006.01)
*G06F 9/54* (2006.01)
(Continued)

(52) U.S. Cl.
CPC ............ *G06F 9/541* (2013.01); *G06F 8/67* (2013.01); *G06F 9/54* (2013.01); *G06F 9/546* (2013.01); *G06F 21/53* (2013.01)

(58) Field of Classification Search
None
See application file for complete search history.

(56) References Cited

U.S. PATENT DOCUMENTS 7,694,328 B2   4/2010 Joshi et al.
7,721,281 B1*  5/2010 Cherepov ............... G06F 21/55
                                          717/171
(Continued)

FOREIGN PATENT DOCUMENTS

WO    WO 2007/113709    10/2007

OTHER PUBLICATIONS

Chin, Erika et al., "Analyzing Inter-Application Communication in Android," ACM, MobiSys'11, Jun. 28-Jul. 1, 2011, Bethesda, MD, USA.

(Continued)

*Primary Examiner* — Trang Doan
(74) *Attorney, Agent, or Firm* — Blakely, Sokoloff, Taylor & Zafman LLP

(57) ABSTRACT

Techniques for handling security of an application and its extension are described. In one embodiment, an application manager of an operating system running within a data processing system launches an application in a first sandboxed environment based on a first security profile associated with the application. In response to receiving a request from the application for accessing a function of an application extension that is associated with the application, the application manager launches the application extension in a second sandboxed environment based on a second security profile associated with the application extension. The application manager is to individually enforce security and manage resources of the application and the application extension in the first and second sandboxed environments based on the first and second security profiles, respectively. The second security profile specifies resources fewer than the first security profile.

25 Claims, 22 Drawing Sheets

Related U.S. Application Data filed on May 29, 2014, provisional application No. 62/004,780, filed on May 29, 2014.

(51) Int. Cl.
  *G06F 21/53* (2013.01)
  *G06F 9/445* (2006.01)
  *G06F 17/00* (2006.01)

(56) References Cited

U.S. PATENT DOCUMENTS

| | | | |
|---|---|---|---|
| 8,255,280 B1* | 8/2012 | Kay | G06F 21/53 |
| | | | 705/26.1 |
| 8,272,048 B2 | 9/2012 | Cooper et al. | |
| 8,352,967 B2 | 1/2013 | Labour et al. | |
| 8,429,741 B2 | 4/2013 | Pizano et al. | |
| 8,479,286 B2 | 7/2013 | Dalcher et al. | |
| 8,631,482 B2 | 1/2014 | Krstic et al. | |
| 8,646,078 B2 | 2/2014 | Kudallur et al. | |
| 8,650,481 B1 | 2/2014 | Boodman et al. | |
| 8,671,416 B2 | 3/2014 | Van Vechten et al. | |
| 2008/0141150 A1* | 6/2008 | Kaloukis | G06F 3/0481 |
| | | | 715/764 |
| 2008/0301142 A1 | 12/2008 | Marolf | |
| 2011/0179483 A1* | 7/2011 | Paterson | G06F 21/56 |
| | | | 726/22 |
| 2012/0185863 A1 | 7/2012 | Krstic et al. | |
| 2013/0132904 A1 | 5/2013 | Primiani et al. | |
| 2013/0160115 A1 | 6/2013 | Venkataramanappa et al. | |
| 2013/0185764 A1 | 7/2013 | Krstic et al. | |
| 2013/0298006 A1 | 11/2013 | Good et al. | |
| 2013/0332917 A1* | 12/2013 | Gaither | G06F 8/67 |
| | | | 717/170 |
| 2014/0059443 A1 | 2/2014 | Tabe | |
| 2015/0074165 A1 | 3/2015 | Rahardja et al. | |

OTHER PUBLICATIONS

The Chromium Projects, Getting Started: Background and Basics, Aug. 2010, http://www.chromium.org/nativeclient/getting-started/getting-started-background-and-basics, 6 pages.

* cited by examiner

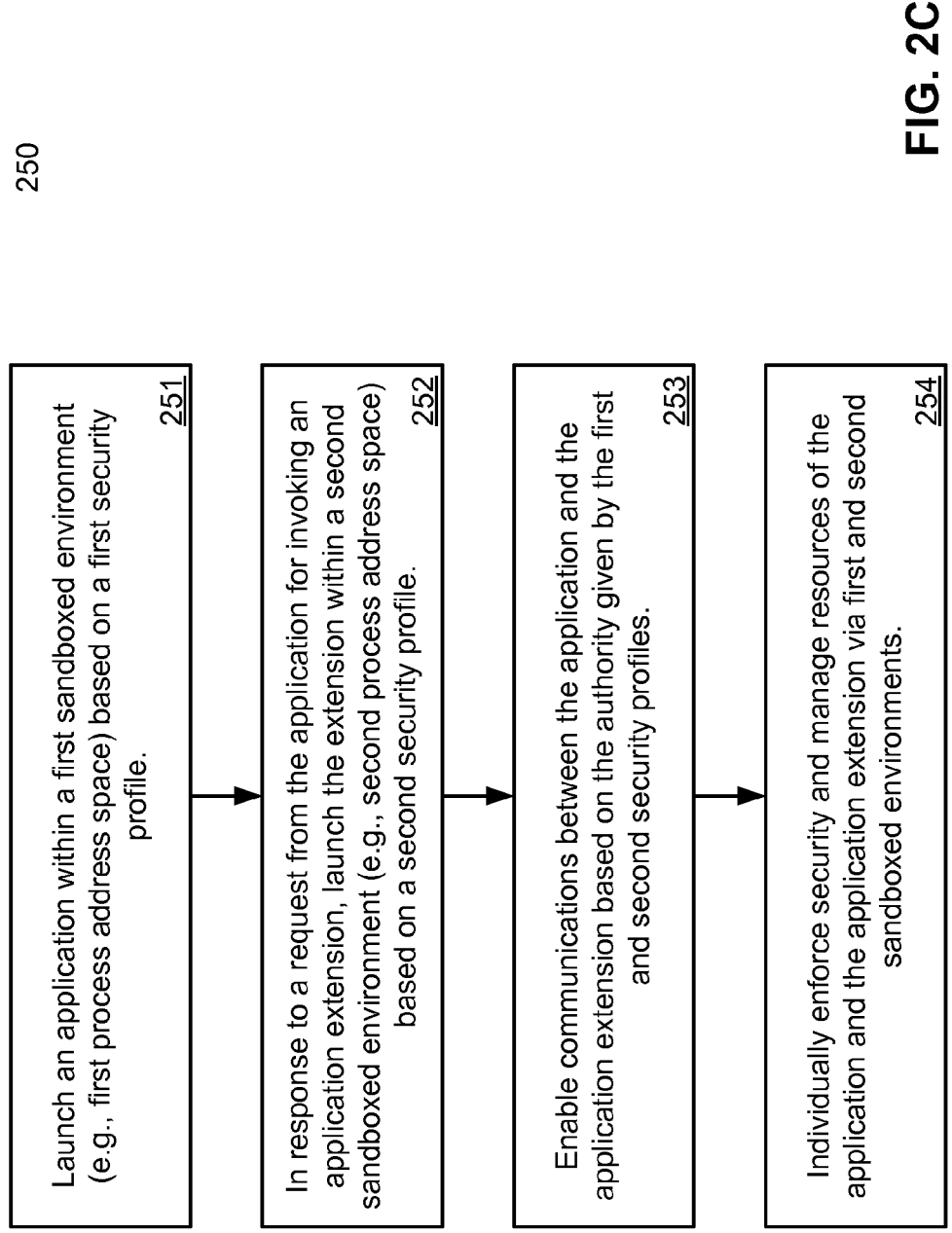

FIG. 12B

Activities — Done
- Mail
- Message
- Twitter
- Facebook

FIG. 12C

Activities — Done
- Add to Favorites
- Bookmark
- Add to Reading List
- Add to
- Copy
- Print
- Request Desktop Site

METHOD AND APPARATUS FOR HANDLING SECURITY OF AN APPLICATION AND ITS EXTENSION

RELATED APPLICATIONS

This application claims the benefit of U.S. provisional patent application Nos. 62/004,777, 62/004,778, and 62/004,780, all filed May 29, 2014. This application is also related to U.S. patent application Ser. No. 14/488,130, filed Sep. 16, 2014 and Ser. No. 14/488,126, filed Sep. 16, 2014. The disclosure of the above-identified applications is incorporated by reference herein in its entirety.

FIELD OF THE INVENTION

Embodiments of the present invention relate generally to an operating system of a data processing system. More particularly, embodiments of the invention relate to securely handling application extensions of applications executed by an operating system of a data processing system.

BACKGROUND

Security concerns for all types of processor-based electronic devices, and particularly for computing devices, have become a significant concern. While some concerns may relate to detrimental actions which may be undertaken by defective code implemented by such devices, the greater concerns relate to the ramifications of various types of attacks made upon such devices through malicious code, including code conventionally known in the field by a number of names, including "viruses," "worms," "Trojan horses," "spyware," "adware," and others. Such malicious code can have effects ranging from relatively benign, such as displaying messages on a screen, or taking control of limited functions of a device; to highly destructive, such as taking complete control of a device, running processes, transmitting and/or deleting files, etc. Virtually any type of imaginable action on a processor-based device has been the subject of attacks by malicious code.

Many of these attacks are directed at computing devices, such as workstations, servers, desktop computers, notebook and handheld computers, and other similar devices. Many of these computing devices can run one or more application programs which a user may operate to perform a set of desired functions. However, such attacks are not limited to such computing devices. A broader group of various types of devices, such as cell phones; personal digital assistants ("PDA's"); music and video players; network routers, switches or bridges; and other devices utilizing a microprocessor, microcontroller, or a digital signal processor, to execute coded instructions have been the subjects of attacks by malicious code.

In one particular situation, one application such as a browser application may have to invoke a plugin (also referred to as an application extension), which may be developed by a third party. Typically, when an application invokes a plugin that is associated with the application (also referred to as a host application), the operating system launches the plugin within the same process address space of the application, as shown in FIG. 1. Referring to FIG. 1, when application 104 invokes plugin 105, application launch module 102 of an application manager 101 loads plugin 105 within the same process address space 106 of application 104. Since application 104 and its plugin 105 are running within the same address space 106, plugin 105 may be able to access resources that are accessible by application 104, where the resources may be managed by resource manager 103. From the view point of resource manager 103, application 104 and plugin 105 are the same process. That may cause application 104 to be vulnerable if plugin 105 turns out to be malware.

For example, if plugin 105 is a third party plugin developed for application 104 and if application 104 can access a local storage and a network, plugin 106 may exploit and attack the files stored in the local storage and the network. In addition, even if plugin 106 is not malware, when plugin 106 crashes, it may bring down application 104 or cause application 104 to malfunction. Furthermore, when plugin 105 is terminated by launch module 102, the termination of plugin 106 may cause application 104 unstable since they are in the same process address space 106.

A number of methodologies have been used in an attempt to reduce or eliminate both the attacks and influence of malicious or defective code. Generally, these methodologies include detection, prevention, and mitigation. Specifically, these methodologies range from attempts to scan, identify, isolate, and possibly delete malicious code before it is introduced to the system or before it does harm (such as is the objective of anti-virus software, and the like), to restricting or containing the actions which may be taken by processes affected by malicious or defective code. However, there has been a lack of efficient ways for handling a plugin associated with an application that invokes another application in a secured manner.

BRIEF DESCRIPTION OF THE DRAWINGS

Embodiments of the invention are illustrated by way of example and not limitation in the figures of the accompanying drawings in which like references indicate similar elements.

FIG. 2C is a flow diagram illustrating a method for executing an application and an application extension according to one embodiment of the invention.

FIGS. 12A-12C are screenshots illustrating an example of a graphical user interface of an application according to one embodiment of the invention.

DETAILED DESCRIPTION

Figure 1:
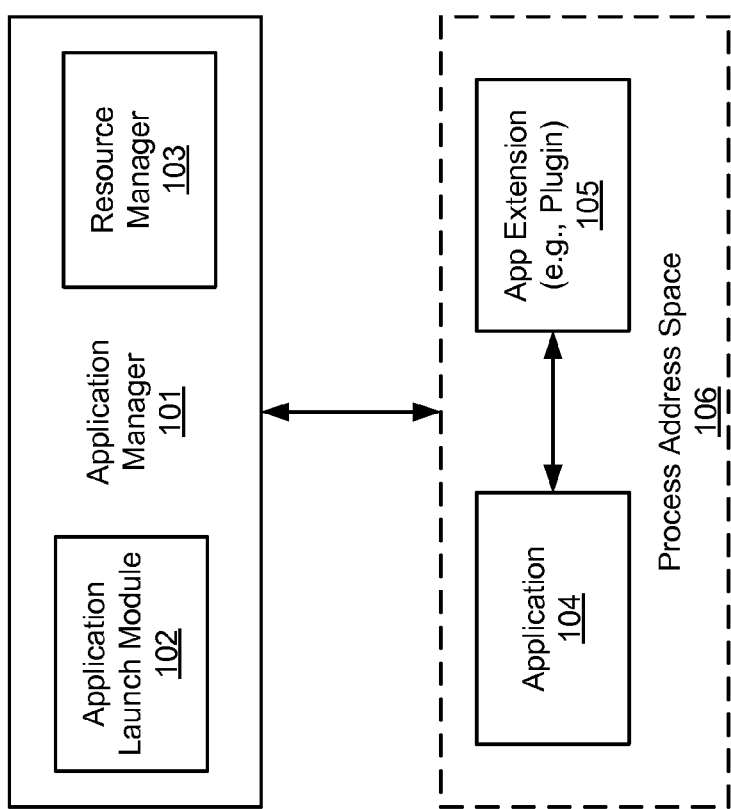
FIG. 1 is a block diagram illustrating a conventional operating system of a data processing system.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to one aspect of the invention, an application extension (also referred to as a plugin or simply an extension) and an application hosting the application extension are loaded and executed in separate process address spaces and treated like separate processes by an operating system. In one embodiment, an application hosting an application extension is launched and executed in a first sandboxed environment and the application extension is launched and executed in a second sandboxed environment. The first sandboxed environment and the second sandboxed environment are configured based on a first security or sandbox profile and a second security or sandboxed profile, respectively. The application and the application extension communicates with each other via an inter-process communications (IPC) framework. The operating system enforces the security and manages resources of the application and the application extension individually or independently based on the first and second security profiles, respectively.

According to one embodiment, when the application extension generates content, such as graphical user interface (GUI) content, to be displayed to a user, the content is injected into the application via the IPC framework and presented to the user, without having the application to directly access the application extension via an application programming interface (API), which requires the application extension running within the same process address space. Specifically, a remote view controller is embedded within each of the application and the application extension to inject the GUI content rendered by the application extension into the application. The remote view controllers running within (or associated with) the application and the application extension are configured to synchronize the user interaction with the GUI content between the application and the application extension.

According to another embodiment, since the application and the application extension are running in their respective process address spaces, the resources associated with the application and the application extension can be independently managed without causing significant interference to the other counterpart. For example, an application extension can be shut down or terminated without affecting the operations of the application, since the communications between the two are managed by the IPC framework. When one of the application and application extension needs to be upgraded or terminated, according to one embodiment, the other party can communicate with the operating system to determine whether a user is currently using the other party to determine whether it is safe to upgrade or terminate itself. For example, when an upgrade request for upgrading an application is received, the application or the upgrade manager may communicate with a central authority (e.g., window server) to determine whether the user is concurrently accessing a user interface of the application extension. The upgrade or termination of the application is performed only if it is determined that the user is not currently using the application extension; otherwise, the request is rejected.

According to another embodiment, when an application extension has been installed by the operating system, an option is provided to the user to activate/enable or deactivate/disable the application extension. For example, an installed application extension of an installed application for an application control center (e.g., a notification center) of an operating system can be displayed within a user interface of the application control center as a hosting application. The user interface of the application control center may display an enable/disable option (e.g., a switch graphical representation such as an icon) to allow the user to enable or disable the installed application extension. The application extension is accessible from the application control center (e.g., to utilize functionalities of the associated installed application) only if the application extension has been enabled; otherwise, the user has to use the installed application associated with the application extension. The application control center may be hooked with extensions of a variety of applications, each extension being capable of being individually configured (e.g., enabled or disabled). Thus, the application control center serves as a centralized entry point to access the functionalities of various applications. As a result, with the extensions hosted and enabled in the application control center, a user does not have to launch and access the applications individually.

According to another aspect of the invention, an extension framework includes a set of extension interfaces, referred to herein as extension points, to allow a first application to invoke an extension of a second application to access a set of predefined functionalities associated with the second application, which is extended by the extension. The set of extension points may include various commonly used or popular functionalities or services associated with the operating system. An extension point defines a set of predefined application programming interfaces (APIs) or communications protocols that allow a client, either being the first application or the second application, to access or provide a service from and to another client. A service provided by an extension point may be provided by a standard component of the operating system or a third party function provided by a third party vendor.

In one embodiment, the extension framework operates as a connecting operator between two processes (e.g., an extension and a host application). The extension framework provides the discovery aspect and extends the security domain. When a first application wishes to access a predefined functionality (e.g., content sharing or photo filtering) provided by another application, the first application communicates with the corresponding extension point associated with that predefined functionality to inquire about who can provide such a service. The extension framework in turn searches and identifies a list of one or more extensions provided by other applications that have been registered with the extension framework to provide the requested service. The extension framework may return the list of the identified extensions to allow the first application to select one of the second applications in the list for the requested service. In response to a selection of one of the extensions, which may be provided by or associated with a second application, the extension framework launches the selected extension in a separate sandboxed environment and facilitates an inter-process communications (IPC) mechanism or framework between the first application and the selected extension to allow the first application to access the functionalities of the selected extension via the IPC communications mechanism.

According to one embodiment, an extension point acts as an interface for a software developer for an extension and provides a domain that the extension operates. Each extension point is associated with a predefined set of policies (e.g., resource entitlements or restrictions) and specifies what messages can be exchanged between the host application and the extension. All extensions designed for a particular extension point must comply with the specification set forth in the predefined policies of that particular extension point. All extensions, when executed in an operating environment, are entitled to or restricted by the same set of operating environment parameters defined by the associated extension point. When the extension of the second application is developed, a developer can utilize an extension template associated that particular extension point as part of a software development kit (SDK) to generate executable images of both the second application, referred to herein as a container application, and the associated extension. The extension and the container application may be released in a bundle. The bundle includes the container application and its metadata describing the container application, and the extension and its metadata describing the extension. However, the container application and the extension can be launched in separate sandboxed environments and operated independently, which may be configured based on their respective metadata and/or the corresponding extension point, although they may access or share a common library or framework.

According to another aspect of the invention, some of the registered extensions may be provided as part of an operating system; others may be provided by third parties and installed by an installer of the operating system. According to one embodiment, an older version of an extension installed or registered earlier can be replaced or overridden by a newer version of the same extension provided by the same extension provider. The installation or registration framework authenticates the extension provider to ensure that only the authorized extension provider can replace or override an extension currently installed. In one embodiment, only the authorized owner of a particular extension can replace its own installed extension.

When an extension is being installed, based on the type of the extension (e.g., identified by a uniform type identifier or UTI) and an extension provider identifier (ID), the installer looks up in the extension registry to determine whether there is an earlier version of the same extension currently installed. If there is an earlier version that has been installed, the installer replaces an extension key in the extension registry with a new extension key obtained from the new extension. An extension key represents a particular version of the extension. Subsequently, when a request is received from a host application for invoking the extension, the newer version of the extension will be identified and launched based on the new extension key.

In one embodiment, one of the extension points provided by the extension framework is a sharing extension point designed to share content in a community or with another user. With a sharing extension point, an application can invoke a sharing extension that extends a sharing functionality of a sharing application, such as Twitter® and Facebook®, to share content on a social website or with another program. As described above, in order to invoke a sharing extension, the sharing extension has to be installed or registered with the extension framework. Typically, a sharing extension would have to register with the system indicating that the extension is capable of providing content sharing services, for example, by registering with a UTI associated with the pre-agreed UTI for content sharing services.

When a host application, such as a browser, attempts to invoke a content sharing service, for example, in response to a "share" command received from a user, the host application communicates with a sharing extension point of the extension framework by providing the proper UTI associated with the content sharing services. In response, the extension framework searches for any installed or registered extensions that are capable of providing the requested services, for example, by matching the UTI of the content sharing services with the UTIs of the installed extensions. A list of sharing extensions having their UTIs matching the sharing UTI will be provided to the user to select one of them.

In one embodiment, once a sharing extension has been selected, either by a user or by the system automatically, the host application transmits a data object representing a reduced resolution image (e.g., thumbnail) of the content to be shared to the sharing extension. The sharing extension creates a share sheet having the reduced resolution image of the content displayed therein. The sharing extension then injects a copy of the share sheet into the host application as a share sheet clone, for example, using a remote view bridge connection (e.g., remote view controller or remote view bridge). The share sheet clone is displayed by the host application. In response to a commit command (e.g., send command) from the host application, the sharing extension requests the full actual content associated with the thumbnail image from the host application. Thereafter, a final share sheet having the actual content embedded therein is then posted on the sharing website.

Figure 2A:
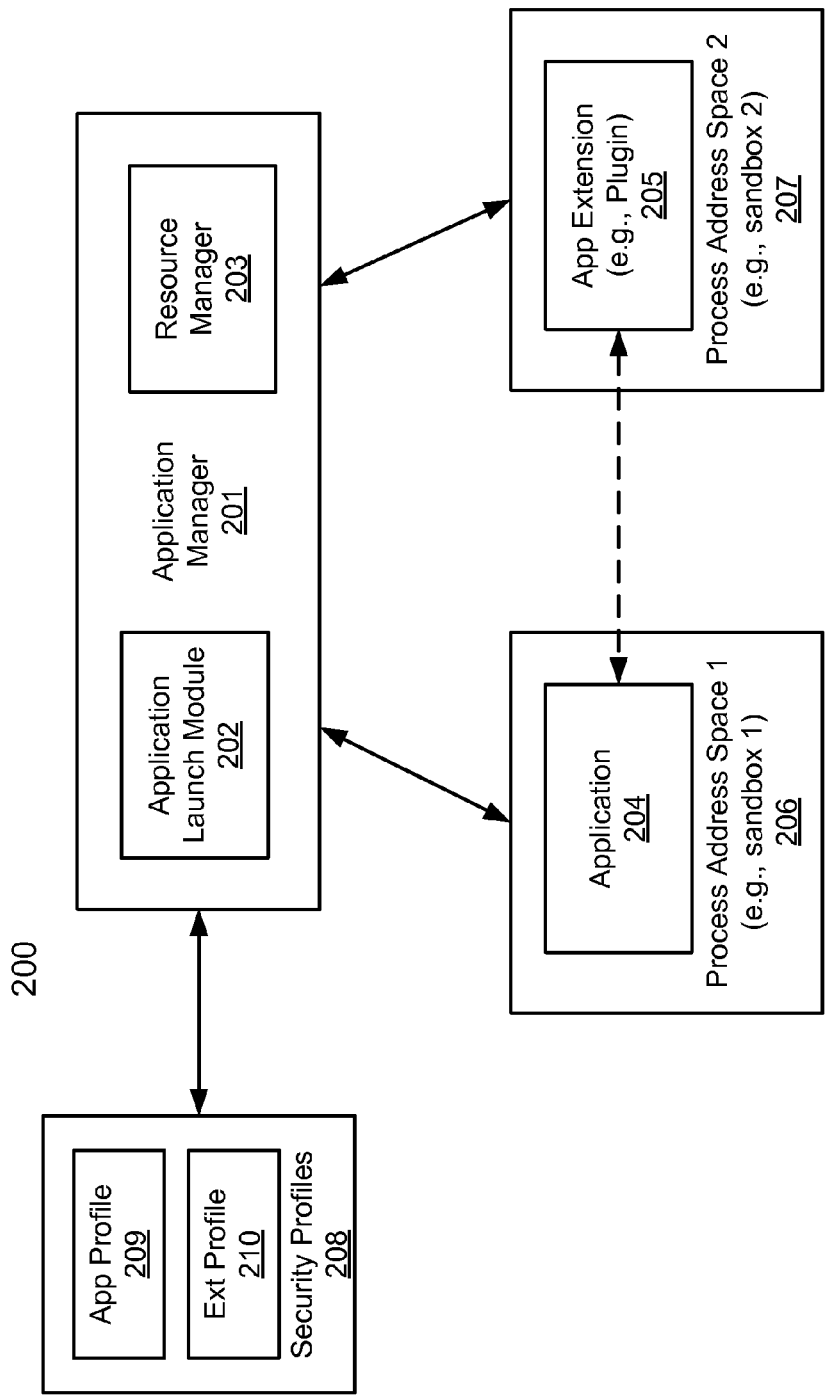
FIGS. 2A-2B are block diagrams illustrating a system architecture for managing application extensions according to certain embodiments of the invention.

FIG. 2A is a block diagram illustrating a system architecture for managing application extensions according to one embodiment of the invention. Referring to FIG. 2A, system 200 represents any kind of data processing systems, such as, for example, a server, a desktop, a laptop, a tablet, or a mobile phone, etc. System 200 includes an application manager 201 having an application launch module 202 and a resource manager 203 for launching and managing applications, such as application 204 and application extension 205, executed within system 200 by processing resources (not shown). Processing resources may present one or more processors or processor cores. A physical processor typically refers to an integrated circuit, which potentially includes any number of other processing elements, such as cores or hardware threads. A core often refers to logic located on an integrated circuit capable of maintaining an independent architectural state, where each independently maintained architectural state is associated with at least some dedicated execution resources. A processor may be a general-purpose processor such as a central processing unit (CPU).

Application manager 201 may be a part of an operating system (OS) running and executed by the processing resources within system 200. An operating system is a collection of software that manages computer hardware resources and provides common services for computer programs. The operating system is an essential component of the system software in a computer system. Application programs usually require an operating system to function. Amongst many functionalities of an operating system, scheduling is the method by which threads, processes or data flows are given access to system resources (e.g. processor time, communications bandwidth). This is usually done to load balance and share system resources effectively or achieve a target quality of service. In addition to application manager 201, an operating system may further include other core components, such as a scheduler, a device manager, a kernel, etc. In order not to unnecessarily obscure embodiments of the present invention, these components are not shown herein. Note that application launch module 202 and/or resource manager 203 may be executed as a separate component outside of application manager 201 or integrated with another component of the operating system. The operating system of system 200 may be any kind of operating systems, such as, for example, iOS™ from Apple®, Android™ from Google®, Windows™ from Microsoft®, or other operating systems (e.g., UNIX, LINUX, real-time or embedded operating systems).

According to one embodiment, each of applications may be executed within a respective dedicated or isolated operating environment, such as a sandboxed environment, and managed by application manager 201. For example, application 204 is launched and executed as a first process within a first sandboxed environment 206 as a first process address space. Application extension 205 is launched and executed as a second process within a second sandboxed environment 207 as a second process address space. A process address space refers to a virtual address space or address space that is the set of ranges of virtual addresses that an operating system makes available to a process. The range of virtual addresses usually starts at a low address and can extend to the highest address allowed by the computer's instruction set architecture. This provides several benefits, one of which is, if each process is given a separate address space, security through process isolation.

Application 204 may be a browser application as a first application, such as the Safari™ from Apple Inc.®, Internet Explorer™ from Microsoft®, or a Google Chrome™ from Google Inc.® Application extension 205 may be an plugin of a second application (not shown), such as an Adobe Acrobat™ from Adobe System®, or a content sharing application such as Facebook™ or Tweeter™ application. A plugin is specifically designed for the first application to access functionalities of the second application. The plugin and the second application may be developed by a third party and released to the market as a bundle. When the second application is installed in system 200, an application installer (not shown) parses the metadata of the bundle and recognizes that application extension 205 is designed for application 204. Application extension 205 is then associated with or mapped to application 204, for example, in the registry of an operating system. As a result, application extension 205 may be installed and available to application 204 to allow application 204 to invoke application extension 205 at runtime, for example, in response to a request received from application 204 searching for a particular type of extension services (e.g., content sharing services).

According to one embodiment, application extension 205 and application 204 hosting application extension 205 are loaded and executed in separate process address spaces 206-207 and treated like separate processes by an operating system. In one embodiment, application 204 is launched and executed in a first sandboxed environment as a first sandboxed process and the application extension 205 is launched and executed in a second sandboxed environment as a second sandboxed process. The first sandboxed environment and the second sandboxed environment are configured based on a first security profile 209 and a second security profile 210 (as part of security profiles 208 for some or all of applications installed in system 200), respectively. Application 204 and application extension 205 communicates with each other via an inter-process communications (IPC) framework (not shown). The operating system enforces the security and manages resources of application 204 and application extension 205 individually or independently based on the first and second security profiles 209-210, respectively.

A sandboxed process refers to a process that has been restricted within a restricted operating environment (e.g., sandbox) that limits the process to a set of predefined resources. Each sandboxed process may be associated with a set of dedicated system resources, such as, for example, a dedicated memory space, a dedicated storage area, or a virtual machine, etc. One of the purposes of sandboxing an application is to isolate the application from accessing other unnecessary or unrelated system resources of another application or a system component, such that any damage caused by the application would not spill over to other areas of system 100.

To provide security, an application may be "contained" by restricting its functionality to a subset of operations and only allowing operations that are necessary for the proper operation, i.e., operation according to its intended functionality. One method to implement a limited set of policies for each application is to contain, or "sandbox" the application. Sandboxing of an application or process can be achieved using operating system level protection to provide containment and to enforce security policies, such as policies that restrict the ability of the application to take actions beyond those functions needed for it to provide its intended functionalities.

When an application has been sandboxed during execution, the application is executed as a sandboxed process or thread within the system that is contained within a sandbox (also referred to as an application container), in which it cannot access certain system resources or another territory (e.g., sandbox) of another application, subject to a security profile associated with the sandboxed application, which is referred to as a sandboxed process or a sandboxed application.

A sandboxed process is the application or other program for which security containment will be implemented. In many cases, a sandboxed process is a user application, but it could be another program implemented on the computing device such as a daemon or a service. To increase security and provide an efficient mechanism, portions of the security system are implemented or executed in a kernel space. In addition, a monitor process module (not shown) is executed in a separate memory space from the sandboxed processes to further insulate them from each other. In particular, a sandboxed process is restricted from accessing memory outside of its process space and is further prohibited from spawning a non-sandboxed process. For example, a security profile of a sandboxed process may include a rule or policy that denies the sandboxed process from using certain system calls, which may be a mechanism that allows processes to alter each other's address spaces.

In some embodiments a policy may prevent a program from performing certain actions based on the state of an external accessory connected to the computing device, e.g. if an accessory of a specific type or identity is connected; is disconnected, or is connected and is in (or is not in) a specific mode. For example, an application may only be allowed to communicate over an externally accessible data bus if an accessory that meets certain criteria is connected to the data bus and is in a receptive mode. Further detailed information concerning sandboxing techniques can be found in U.S. patent application Ser. No. 11/462,680, filed Aug. 4, 2006, now U.S. Pat. No. 8,272,048, which has been assigned to a common assignee of the present application and is incorporated by reference herein in its entirety.

Referring back to FIG. 2A, security profile 209 specifies a first set of restricted resources that application 204 can utilize during its operations within process address space 206. Similarly, security profile 210 specifies a second set of restricted resources that application extension 205 can utilize during its operations within process address space 207. In this example, the second set of resources may be fewer (e.g., more restricted) than the first set of resources. For example, application 204 may be able to access a network and a local storage of system 200, while application extension 205 may not be able to access the same network, but it may be able to access the local storage of system 200.

According to one embodiment, one or more entitlements are defined for each program or application that is to be deployed in a data processing system. The entitlements represent certain functions or resources that the program is entitled to access during its execution. The entitlements may be specified by a developer during development of the program or alternatively, entitlements can be specified by an authorization entity, such as authorization server or provisioning server, which provisions or distributes the program. Such entitlements may be specified as an attribute or metadata attached to or embedded within the program, and optionally signed by the authorization entity using a digital certificate.

Entitlements can then be used to generate a set of rules specifying certain actions or resources that a program can or cannot do or access during execution of the program. The set of rules are then dynamically compiled, for example, during an installation of the program, into a security profile for the program. During the execution of the program, the security profile is used to enforce the set of rules to restrict the program from performing any action or accessing any resource that the program is not entitled. This in effect forces or contains the program to operate in a restricted operating environment (e.g., a sandbox or sandboxed environment). Resources refer to any kind of resources in a data processing system or electronic device, such as, for example, memories, inputs/outputs (IOs), buses, storage, files, network connections (e.g., sockets, ports, or network addresses), inter-process communications channels (e.g., UNIX domain sockets, XPC, MACH ports), etc.

Restricting execution of a program within a restricted operating environment can reduce the changes of the program interfering or causing damages to other components or resources of an electronic device. For example, a program may be developed by a third party and downloaded from a network. The program may include a malfunctioning component or routine (e.g., programming bugs), which may accidentally access to certain critical memory space that normally exclusively utilized by an operating system, microprocessor, bus, or other components of the electronic device. Such actions may cause the electronic device to crash. Alternatively, a program may be a malicious program that is developed to intentionally cause damage to an operating environment and/or electronic device. For example, a program with virus may be specifically developed to take control of the electronic device and/or steal confidential information of a user that operates the electronic device. By restricting the execution of a program within a restricted operating environment, such damage can be greatly reduced.

Referring back to FIG. 2A, in this example, by executing application 204 and application extension 205 in separate process address spaces 206-207, security of application 204 and application extension 205 can be independently enforced and managed. The malfunction of one entity (e.g., application extension 205) would not cause much damage of the other (e.g., application 204). In addition, resources associated with application 204 and application extension 205 can be efficiently managed. For example, if application extension 205 is no longer needed by application 204, application extension 205 can be individually terminated or unloaded, and its resources can be released back to a resource pool for other usages without significantly affecting the operations of application 204.

Figure 2B:
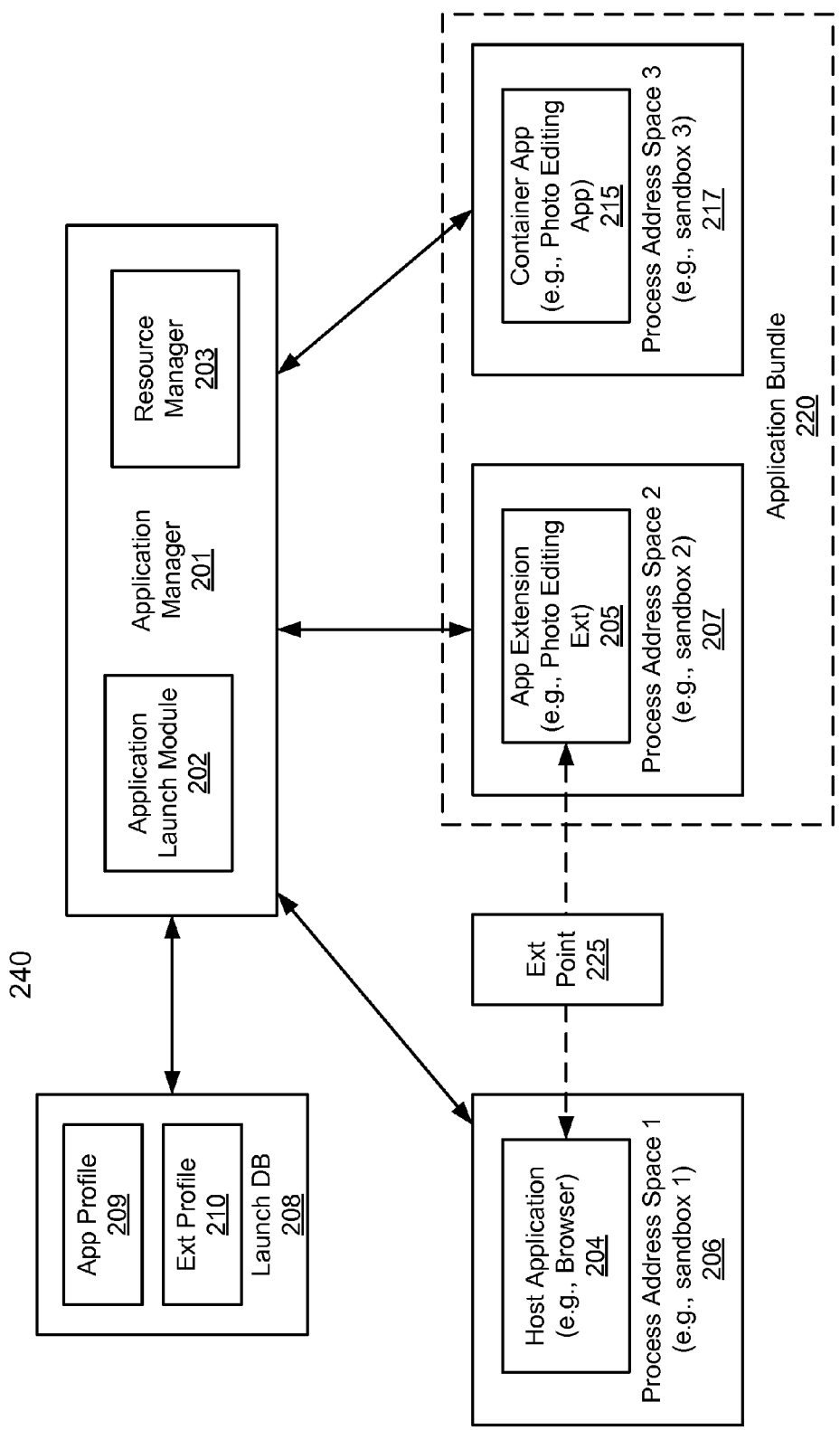

FIG. 2B is a block diagram illustrating a system architecture for managing application extensions according to another embodiment of the invention. Referring to FIG. 2B, system 240 represents any kind of data processing system, such as, for example, a server, a desktop, a laptop, a tablet, or a mobile phone, etc. Similar to system 200 of FIG. 2A, system 240 includes an application manager 201 having an application launch module 202 and a resource manager 203 for launching and managing applications, such as application 204 and application extension 205, executed within system 200 by processing resources.

According to one embodiment, application 204 and application extension 205 communicates with each other via an inter-process communications (IPC) framework (not shown), which may be brokered by corresponding extension point 225. Extension point 225 may be one of various extension points that have been defined by the operating systems and agreed upon by the extension service providers.

In order to allow application 204 and extension 205 to communicate with each other application 204 and extension 205 have to conform to a set of policies and/or communications protocol(s) (e.g., APIs) that are specifically designed for extension point 225. Thus, application 204 and extension 205 have to be compiled using an SDK or libraries specifically for extension point 225.

The operating system enforces the security and manages resources of application 204 and application extension 205 individually or independently based on the first and second security profiles 209-210, respectively. Note that second application 215, when executed, may be launched in a separate sandboxed environment 217. When application 204 accesses a functionality provided by extension 205, there is no need to launch container application 215 as they are treated as separate programs, although extension 205 and application 215 may share the same library or framework during the execution.

Referring back to FIG. 2B, in this example, by executing application 204 and application extension 205 in separate process address spaces 206-207, security of application 204 and application extension 205 can be independently enforced and managed. The malfunction of one entity (e.g., application extension 205) would not cause much damage of the other (e.g., application 204). In addition, resources associated with application 204 and application extension 205 can be efficiently managed. For example, if application extension 205 is no longer needed by application 204, application extension 205 can be individually terminated or unloaded, and its resources can be released back to a resource pool for other usages without significantly affecting the operations of application 204.

FIG. 2C is a flow diagram illustrating a method for executing an application and an application extension according to one embodiment of the invention. Method 250 may be performed by processing logic which may include software, hardware, or a combination thereof. For example, method 250 may be performed by a system as shown in FIG. 2A and/or FIG. 2B. Referring to FIG. 2C, at block 251, processing logic launches a first application in a first sandboxed environment (e.g., first process address space) based on a first security profile of the first application. At block 252, in response to a request from the first application for invoking an application extension (e.g., plugin), processing logic launches the application extension within a second sandboxed environment (e.g., second process address space) based on a second security profile associated with the application extension. The application extension may be an extension of a second application, where the extension is specifically designed to allow the first application accessing functionalities of the second application. At block 253, processing logic enables communications between the application and the application extension based on the authority given by the first and second security profiles. At block 254, processing logic individually enforces the security and manages the resources of the first application and the application extension via the first and second sandboxed environments.

According to one embodiment, when the application extension generates content, such as graphical user interface (GUI) content, to be displayed to a user, the content is injected into the application via an IPC framework and presented to the user, without having the application to directly access the application extension via an application programming interface (API), which requires the application extension running within the same process address space. Specifically, a remote view controller is embedded within each of the application and the application extension to inject the GUI content rendered by the application extension into the application. The remote view controllers running within or associated with the application and the application extension are configured to synchronize the user interaction with the GUI content between the application and the application extension.

Figure 3A:
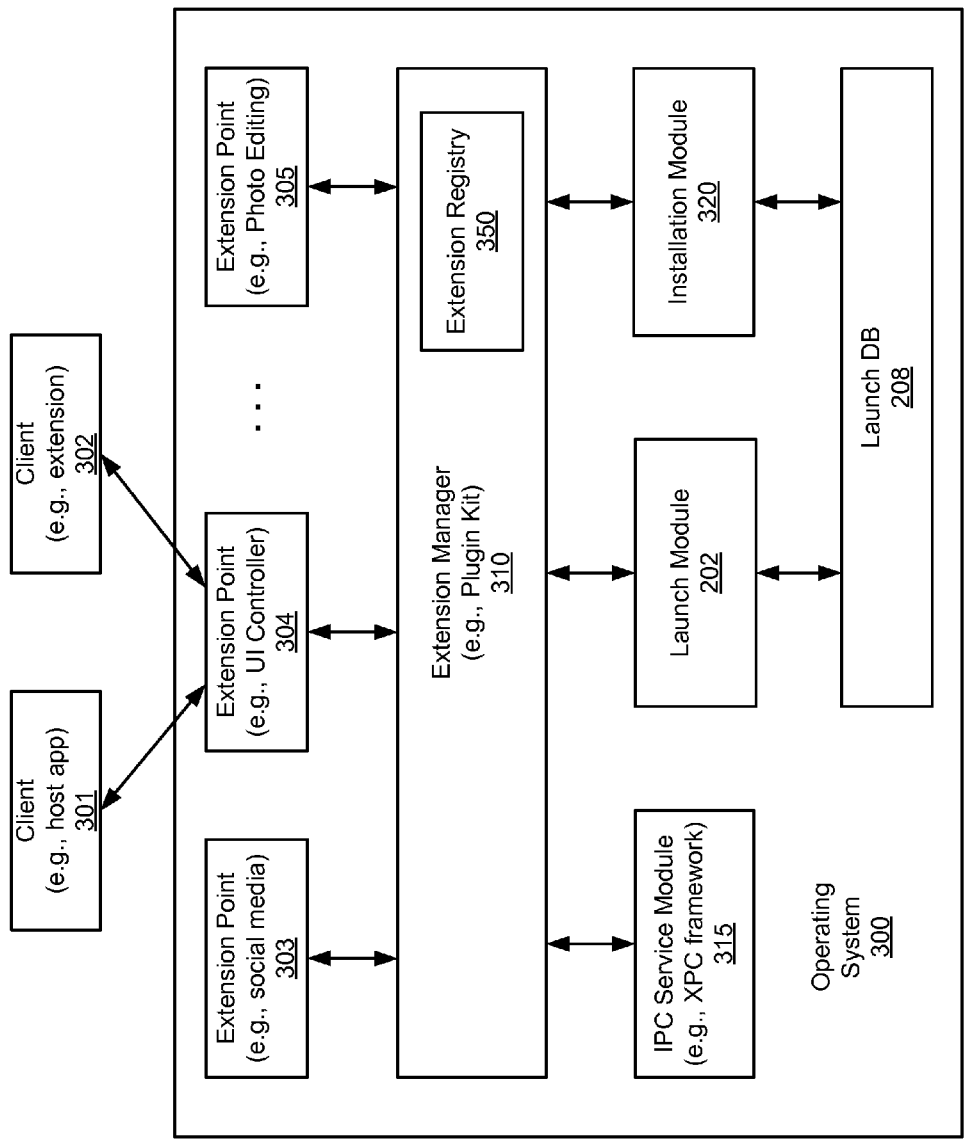
FIGS. 3A-3B are block diagrams illustrating an example of architecture of an operating system according to certain embodiments of the invention.

FIG. 3A is a block diagram illustrating an example of architecture of an operating system according to one embodiment of the invention. Operating system 300 may be implemented as part of a system as shown FIG. 2A and/or FIG. 2B. Referring to FIG. 3A, operating system 300 includes, amongst others, a set of one or more extension points 303-305 to allow various clients, such as clients 301-302, access via extension points 303-305. Each of extension points 303-305 represents a set of predefined APIs or protocols to allow one client as a host application to obtain a predefined service or services provided by another client as an extension that extends at least a portion of functionalities of another application as a container application. Each of extension points 303-305 may further define the resources, scheduling, and termination schemes (e.g., which of the process should be terminated first, etc.) for the processes associated with the extension point. In one embodiment, extension points 303-305 may include various commonly used or popular functionalities or services associated with operating system 300. An extension point defines a set of predefined application programming interfaces (APIs) or communications protocols that allow a client to access or to provide a service from and to another client. A service provided by an extension point may be provided by a standard component of the operating system or a third party function provided by a third party vendor.

Extension points 303-305 may be managed by extension manager 310, where extension points 303-305 may be collectively referred to as an extension interface, an extension layer, or an extension framework, as part of system component of operating system 300. When extension 302, as well as, its corresponding container application (not shown), is installed, installation module 320 parses metadata of an application bundle containing extension 302 and its container application. Based on the metadata associated with extension 302, installation module 320 recognizes that extension 302 is specifically designed and developed for extension point 304. For example, extension 302 may be developed using a specific extension template and compiled with a specific set of libraries corresponding to extension point 304.

Installation module 320 then installs extension 302 in operating system 300 and stores any information related to extension 302 in launch database 208. For example, a security profile (e.g., configuration file) of extension 302 may be compiled and stored in launch database 208. The security profile may include information indicating that extension 302 is capable of providing a service or services through extension point 304. The security profile may further include resource entitlements and/or restrictions that may be subsequently utilized to configure a sandboxed environment when extension 302 is launched. Other extensions may be installed in a similar way by installation module 320. In addition, extension 302 may also be registered in extension registry 350, which may be used subsequently for searching extension services in response to a query for a particular type or class of extension services, for example, based on UTIs of the extensions being installed. Note that extension registry 350 and launch database 208 may be integrated into a single repository having a query application programming interface (API).

Figure 6A:
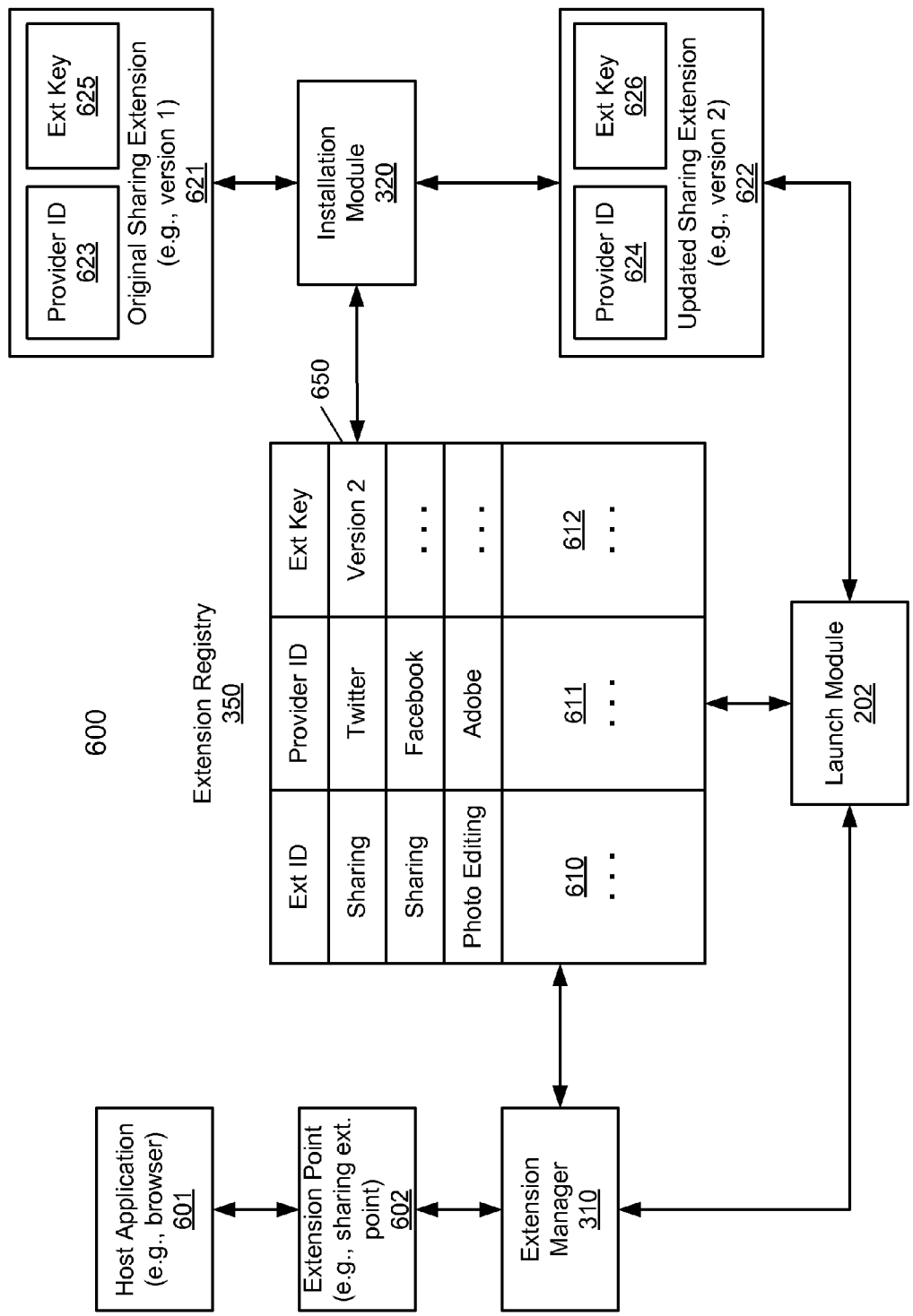
FIG. 6A is a block diagram illustrating a registration system of an extension framework according to one embodiment of the invention.

Subsequently, when a client, in this example, application 301, inquires by communicating via extension 304 about a service available for extension point 304 (also referred to as an extension service), extension manager 310 invokes launch module 202 (or discovery module, not shown) to discover any extensions installed in the system that are capable of providing the inquired service. In response, launch module 202 searches within launch database 208 to identify and determine which of the installed extensions are capable of providing such a service. In one embodiment, the inquiry may include information specifying certain specific resources that are required for the service. In response, launch module 202 searches and identifies those who can handle the specified resources. For example, a host application may specify the data size that a service is required to handle. Thus, the extension framework as shown in FIG. 3A is able to match the capabilities of extensions with the specification of the requested services. Alternatively, extension manager 310 may query extension registry 350 to identify a list of extensions (e.g., based on UTIs) that are capable of providing the requested extension service or services, where launch database 208 contains information (e.g., sandbox configuration or profiles) for configuring a sandboxed operating environment when launching an extension. An example of extension registry 350 is shown in FIG. 6A and described in details further below.

If there is only one extension installed capable of providing services for extension point 304, launch module 202 may automatically launch the identified extension. If there are multiple extensions that are capable of providing services for extension point 304, launch module may present a list of the extensions to allow a user or client 301 to select one of them for launching. If there are multiple versions of the same extension installed, at least some of the versions may be presented to the user or alternatively, the latest version may be presented. An earlier version of an extension may be replaced or overridden by an authenticated extension provider in extension registry 350, such that the latest version of the extension is identified and utilized. Once the selected extension, in this example, extension 302, has been launched, extension manager 310 invokes IPC service module 315 to facilitate IPC communications between client 301 and client 302 via extension point 304. In one embodiment, the communications between client 301 and client 302 are asynchronous message based communications, such as the XPC framework available from Apple Inc.

In one embodiment extension points 303-305 may include, but are not limited to, an extension point for the notification center of operating system 300, an extension point for a third-party keyboard, an extension point for social media, an extension point for services with a user interface (UI), an extension point for a file provider/picker, an extension point for photo editing and/or filtering, an extension point for translation, and an extension point for a file/content finder. Some of these extension points are referred to as action extension points. Such an action extension is designed to extend viewing and/or editing functionality of another application within a host application. A user can initiate a service from a host application. The service will use the content provided by the user (e.g., selected text, image on rollover, via a toolbar item, a contextual menu, etc.). Examples of the action extensions include, but are not limited to, a service to translate selected content, a service to view attributes of an image in a document, or a service to apply a filter on an image, etc. A filtering extension may be designed to specify a predicate, or a simple instruction to let the system build a predicate, which is matched against the shared data in order to list the relevant extensions.

Figure 3B:
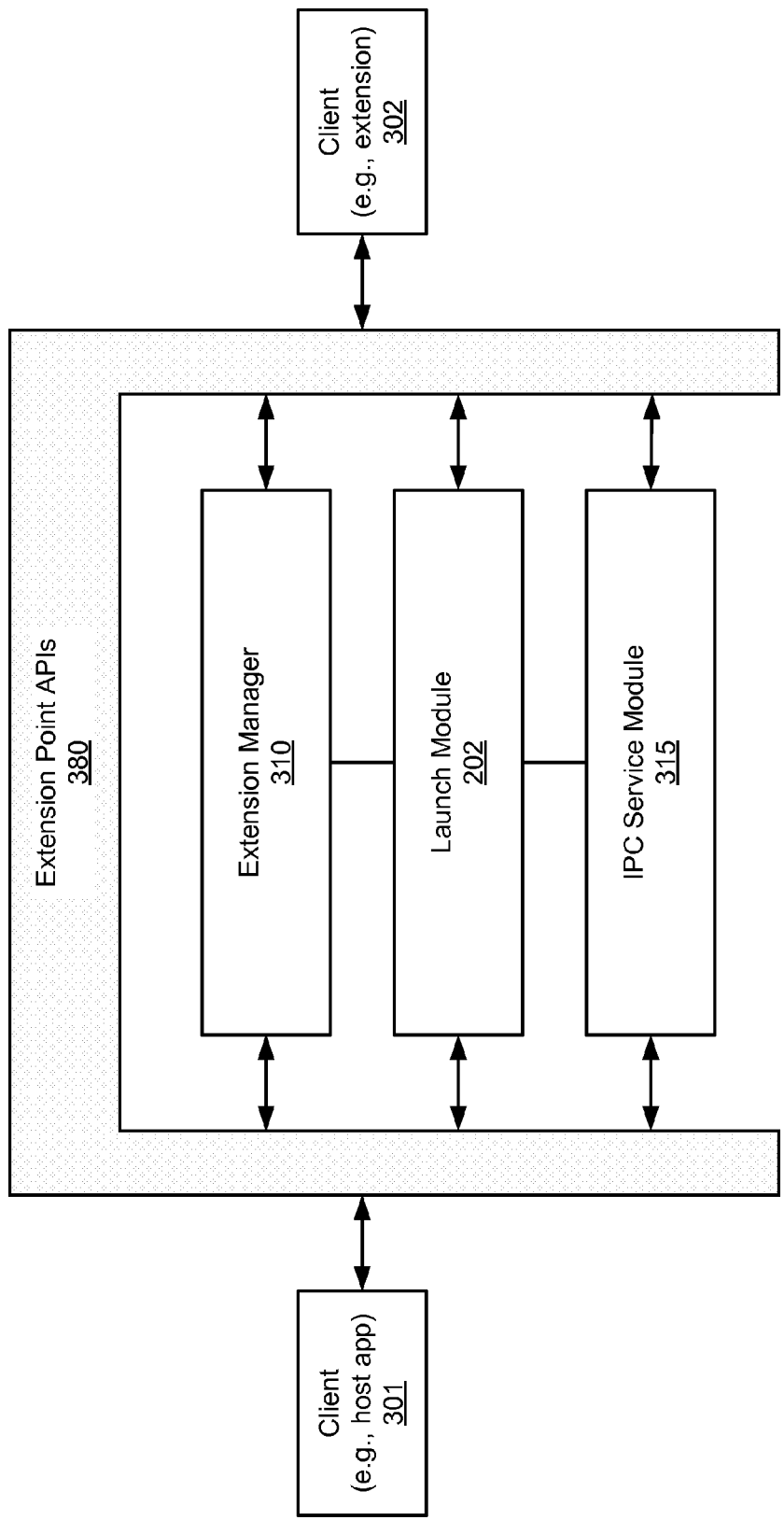

In one embodiment, each of extension points 303-305 includes at least two sets of APIs, one for host applications to invoke extension services and the other for extensions to provide extension services, as shown in FIG. 3B. Referring to FIG. 3B, since client 301 and client 302 are executed separate sandboxed environments, they normally cannot directly communicate with each other. Rather, client 301, as a host application in this example, communicates using a first set of APIs or protocols associated with extension point 380 to access system resources such as extension manager 310, launch module 202, and IPC service module 315, etc. Similarly, client 302, as an extension in this example, communicates using a second set of APIs or protocols associated with extension point 380 to access extension manager 310, launch module 202, and IPC service module 315. In order to access extension point 380, client 301 and client 302 may be compiled and linked using an SDK that is associated with extension point 380 during the software development.

Figure 4A:
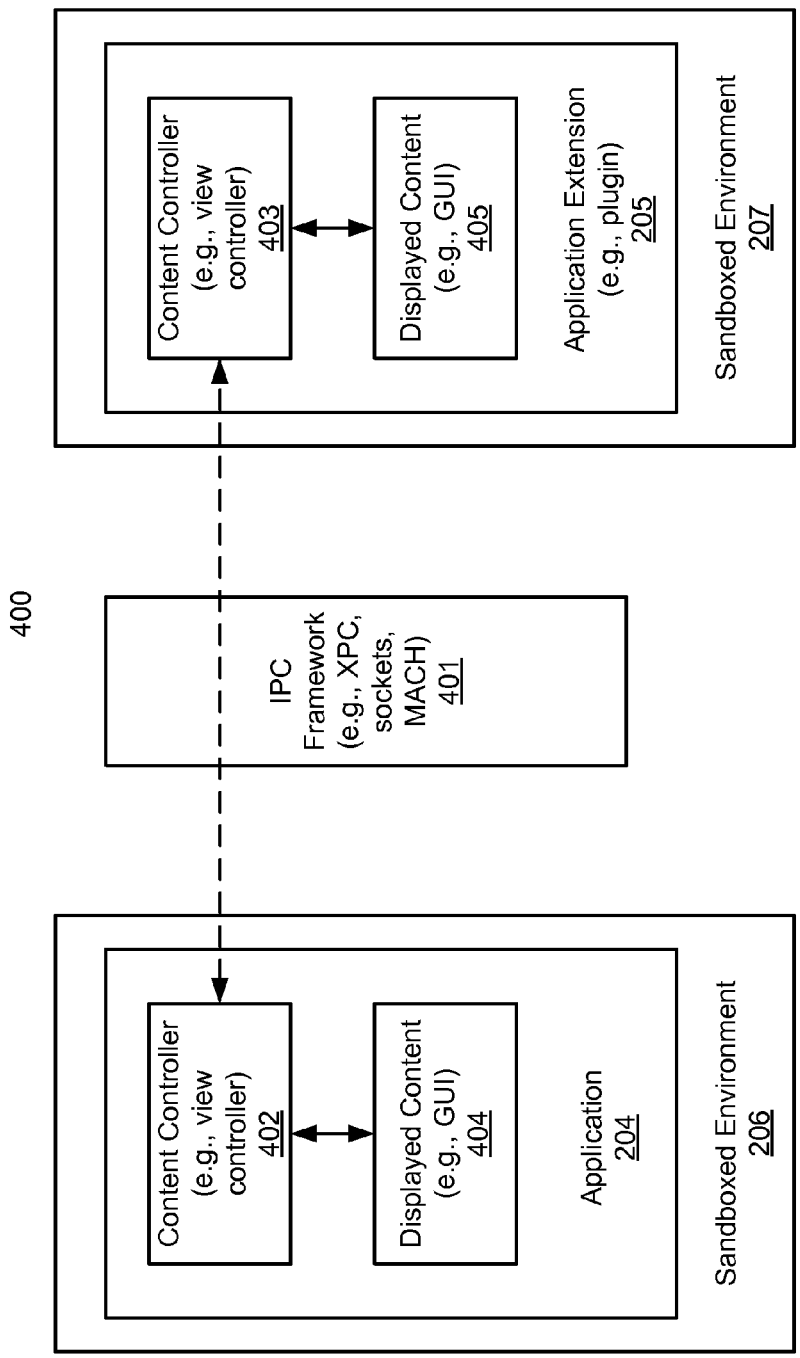
FIG. 4A is a block diagram illustrating a communications configuration between an application and an application extension according to one embodiment of the invention.

FIG. 4A is a block diagram illustrating a communications configuration between an application and an application extension according to one embodiment of the invention. Referring to FIG. 4A, system 400 may be implemented as a part of any of the extension systems as described above. Referring to FIG. 4A, as described above, application 204 is executed within sandboxed environment 206 while application extension 205 is executed within sandboxed environment 207, where sandboxed environments 206-207 correspond to different process address spaces. Since application 204 and application extension 205 are executed in different address spaces, they are not allowed to directly access the resources (e.g., memory addresses) associated with the other counterpart; otherwise, it may cause a page fault.

According to one embodiment, application 204 and application extension 205 communicate with each other via IPC framework 401. IPC framework 401 defines a set of communications interfaces or protocols to allow the clients, in this example, application 204 and application extension 205, to asynchronously communicate with IPC framework 401, where IPC framework 401 is to facilitate the exchange of data or messages amongst the clients. IPC framework 401 can be any kind of IPC frameworks, such as, for example, XPC or MACH from Apple Inc., UNIX socket framework, etc. IPC framework 401 may be implemented as a set of IPC services amongst the parties. When application 204 and application extension 205 would like to communicate with each other, they establish a connection to the IPC service, for example, by connecting to a pre-agreed upon IPC service (e.g., IPC service name) and start sending and receiving data or messages via the connection. For example, in order to develop application extension 205 that is specifically used with application 204, a developer may have to develop code that specifically connect to a specific IPC service name that is agreed upon with a developer who develops application 204, such that both application 204 and application extension 205 can connect to the same IP service.

The lifetime of services involved with IPC framework 401 may be managed by the operating system. A host application does not have to manually start or stop the IPC service; rather, it can simply connect to the service, and the operating system can automatically launch the service if it is not running and terminate it when it is not needed. With the IPC framework 401, an application can split itself into multiple services that each handle security sensitive component. These services can run with very limited permissions and will not able to do much damage if they are compromised. IPC framework 401 can also allow an application to access certain system services provided by the operating system in a more secure manner and allow third-party applications to share data with each other without compromising the security model of the operating system.

In one embodiment, when application extension 205 renders GUI content 405 that is intended to be presented by application 204, content controller 403 running within application extension 205 is configured to inject the GUI content into application 204 to be presented content 404 by communicating with the corresponding content controller 402. Content controllers 402-403 may further communicate with each other to synchronize content changes and/or user interaction with the displayed content. A content controller may be a remote view controller that allows a process or application to share a user interface with another process or application. The content controller 403 copies content 405 to content controller 402 without requiring application extension 205 running within the same address space of application 204. The remote view service may be implemented as an IPC service described above.

Figure 4B:
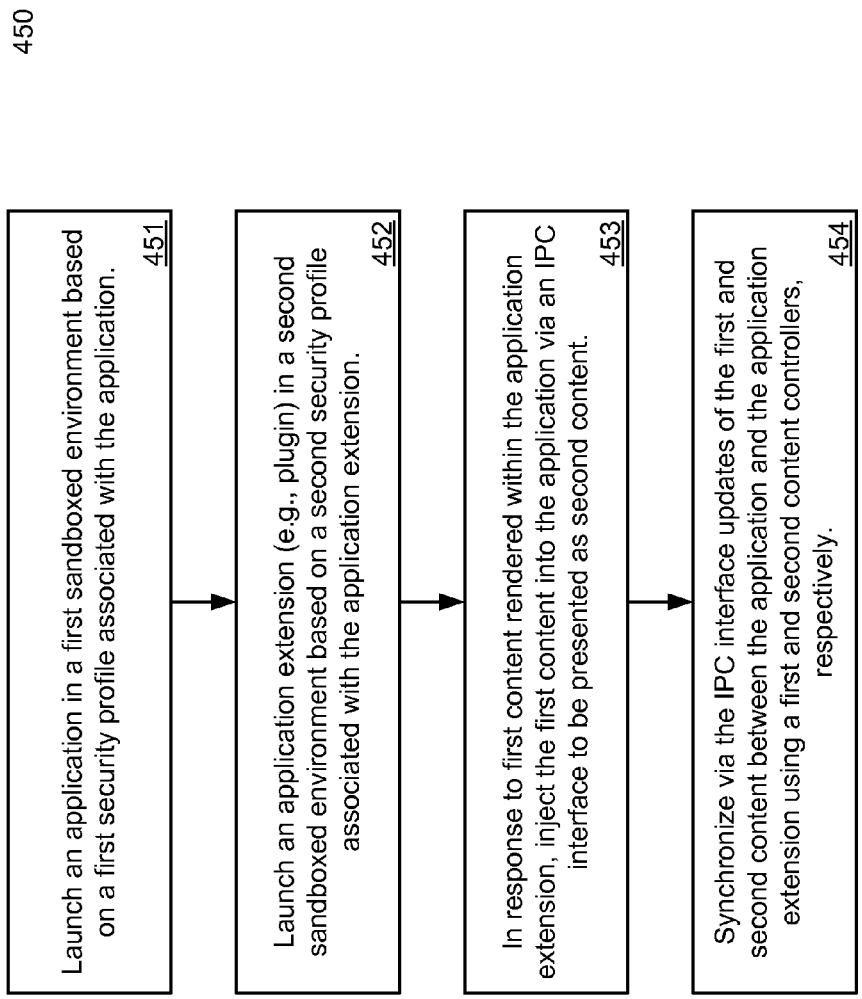
FIG. 4B is a flow diagram illustrating a method for handling application extensions according to another embodiment of the invention.

FIG. 4B is a flow diagram illustrating a method for handling application extensions according to another embodiment of the invention. Method 450 may be performed by processing logic which may include software, hardware, or a combination thereof. For example, method 450 may be performed by system 400 of FIG. 4A. Referring to FIG. 4B, at block 451, processing launches a first application in a first sandboxed environment based on a first security profile associated with the first application. At block 452, processing logic launches an application extension (e.g., plugin) in a second sandboxed environment based on a second security profile associated with the application extension. In one embodiment, the application extension is an extension of a second application that is specifically designed for the first application to access the functionalities of the second application. At block 453, in response to first content rendered within the application extension, processing logic injects the first content via IPC framework 401 into the first application to be presented as second content. At block 454, processing logic synchronizes via the IPC framework updates of the first and second content between the first application and the application extension.

According to one embodiment, an extension point acts as an interface for a software developer for an extension and provides a domain that the extension operates. Each extension point is associated with a predefined set of policies (e.g., resource entitlements or restrictions) and specifies what messages can be exchanged between the host application and the extension. All extensions designed for a particular extension point must comply with the specification set forth in the predefined policies of that particular extension point. All extensions, when executed in an operating environment, are entitled to or restricted by the same set of operating environment parameters defined by the associated extension point.

Figure 5A:
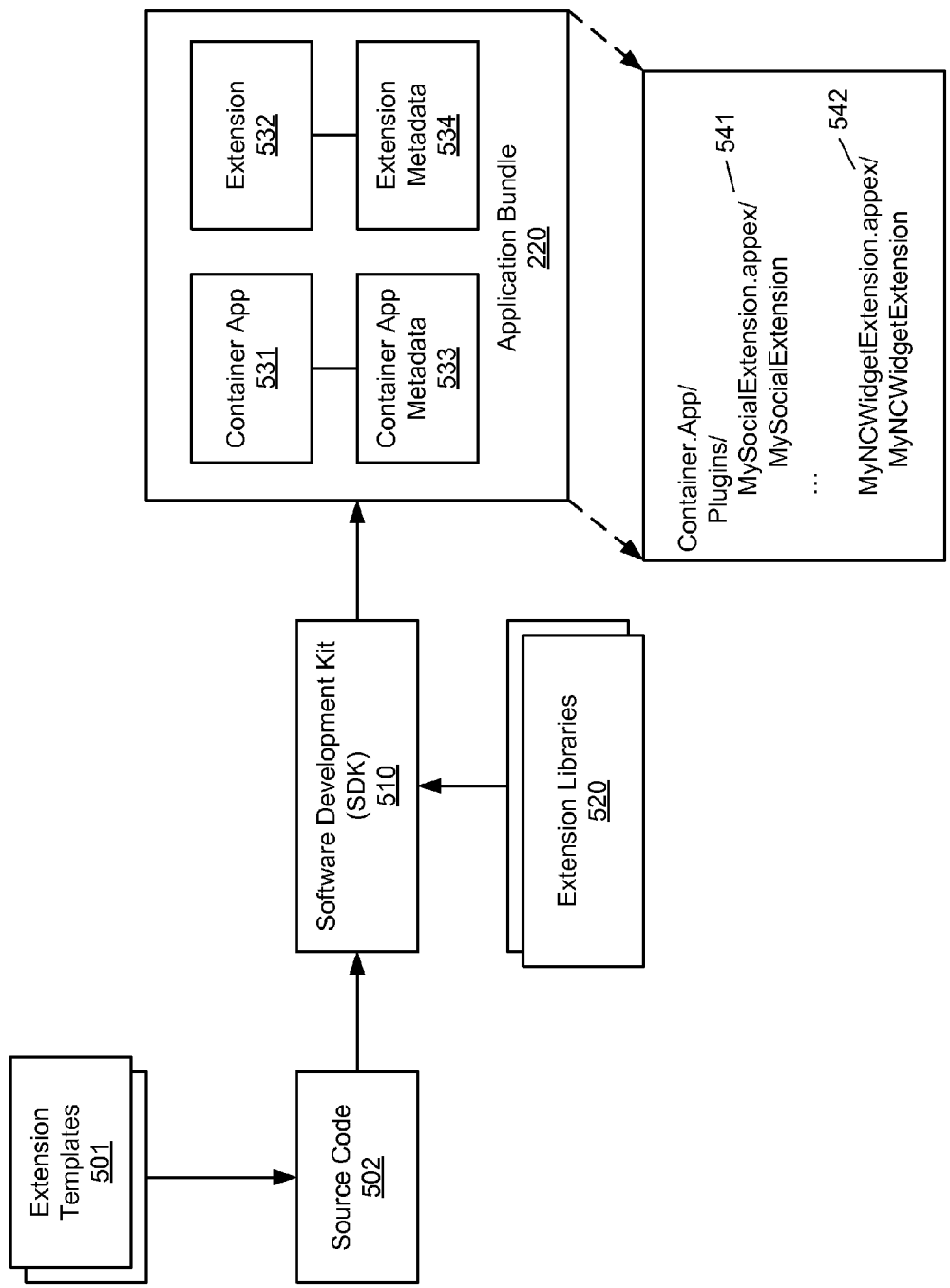
FIG. 5A is a block diagram illustrating a system for developing an extension for an extension point according to one embodiment of the invention.

When the extension of the second application is developed, as shown in FIG. 5A, a developer can utilize an extension template 501 associated that particular extension point as part of a software development kit (SDK) to generate, based on source code 502, executable images of both a container application 531 and the associated extension 532, as well as their respective metadata 533-534. The extension and the container application may be released as bundle 220. The bundle includes the container application 531 and its metadata 533 describing the container application, and the extension 532 and its metadata 534 describing the extension. However, the container application 531 and the extension 532 can each be launched in a separate sandboxed environment and operated independently, which may be configured based on their respective metadata and/or the corresponding extension point, although they may access or share a common library or framework. In some embodiments, a container application may include multiple extensions, in this example, extensions 541 and 542. Each of the extensions may further specify an extension provider ID (e.g., extension provider ID 551) and its version (e.g., version identifier 552, also referred to as an extension key). An extension provider ID is an identifier uniquely identifying an extension provider and certified by a predetermined authority (e.g., an operating system provider). When a newer version of an extension is installed, after the corresponding extension provider has been successfully authenticated, a corresponding extension key in the extension registry (e.g., extension registry 350 of FIG. 3A) is replaced with a new extension key (e.g., version 552), such that the newer version of the extension is invoked instead of the older version.

An application bundle may be a directory that allows related resources, such as software code, to be grouped together. An application bundle may be identified by the ".app" extension (e.g., "application.app"). An application bundle may include a number of directories and/or subdirectories, such as "Contents," "Operating system," which may contain the application's executable code, identified, for example, by the ".exe" extension (e.g., "Application.exe," however in other embodiments, the executable file may have another extension or may not include an extension), "Resources," which may contain resources of the application (e.g., "Image.png"), and "XPC services," which may contain application defined services. These services may be a set of computer implemented instructions designed to implement a specific function or perform a designated task. In one embodiment, the application defined services are services which are available only to the application represented by the application bundle. In addition, these application defined services may be tied to the lifetime of the application, in that once the application is terminated, the service is no longer available.

In one embodiment, the executable code in an application bundle may link against one or more frameworks. Frameworks may include software libraries having reusable abstractions of software code wrapped in a well-defined application programming interface (API). The frameworks allow software developers to implement the standard structure of an application for a specific development environment (e.g., the operating system running on the computing device). The frameworks linked against by an application may be represented by framework bundles. Some examples of commonly used frameworks may include a core audio framework and a core graphics framework. The executable files in an application may link against the frameworks by storing a framework name or other identifier of framework bundles in a designated location in the application bundle and/or by calling an API provided by the associated framework.

The services included in the framework bundles may be made available to a number of different applications that are all linking against the same framework. In one embodiment, there may be a single global instance of a particular service in a framework that is available to a certain number of different applications. In another embodiment, there may be an individual instance of a particular service that is instantiated for each user of the system, or an instance of the service for each application that is running in the system. In other embodiments, each service may have a different designation as a global instance, a per-user instance, or a per-application instance, where there may be services of each type present at the same time in the same or different framework(s). In addition, some other instance may be created at the discretion of the framework. For example, one framework may have one instance for each browser tab or window that is opened. Each instance may be identifiable by a universal unique identifier (UUID).

At the time an application is built, the application designer may specify what services are defined specifically in the application, as well as what frameworks the application will link against. The application designer may also have knowledge of what services are contained within those frameworks. Thus, between the application defined services and the services in linked frameworks, the application designer is able to grant access to all of the services that the application executable file needs or may be likely to access. In addition, the application designer is able to specify which services the application executable file is allowed to access. Therefore, unnecessary and unauthorized services are not made available to the application. This information, in a form of metadata, may eventually be compiled as a part of entitlements of a security profile associated with the application.

Referring back to FIG. 5A, for at least one of the extension points associated with an operating system, an extension template (e.g., template 501) may be defined to allow a software developer to have a simple and user friendly user interface to construct source code (e.g., source code 502) for that particular extension point. For example, an extension template may be associated with a set of predefined certain objects or classes that are typically required to access the associated extension point, either from a point view of a host application or from a point of view of an extension. The extension template may further identify a set of libraries or frameworks that are specifically associated with the extension point. Thus, when an SDK tool, such as a compiler and/or linker, of SDK 510 compiles source code 502, the relevant libraries or frameworks, such as libraries 520, are utilized. As a result, all extensions compiled for the same extension point will be compatible with the same set of APIs and protocols and entitled to the same resource entitlements or limited to the same restrictions of an operating environment during execution.

Figure 5B:
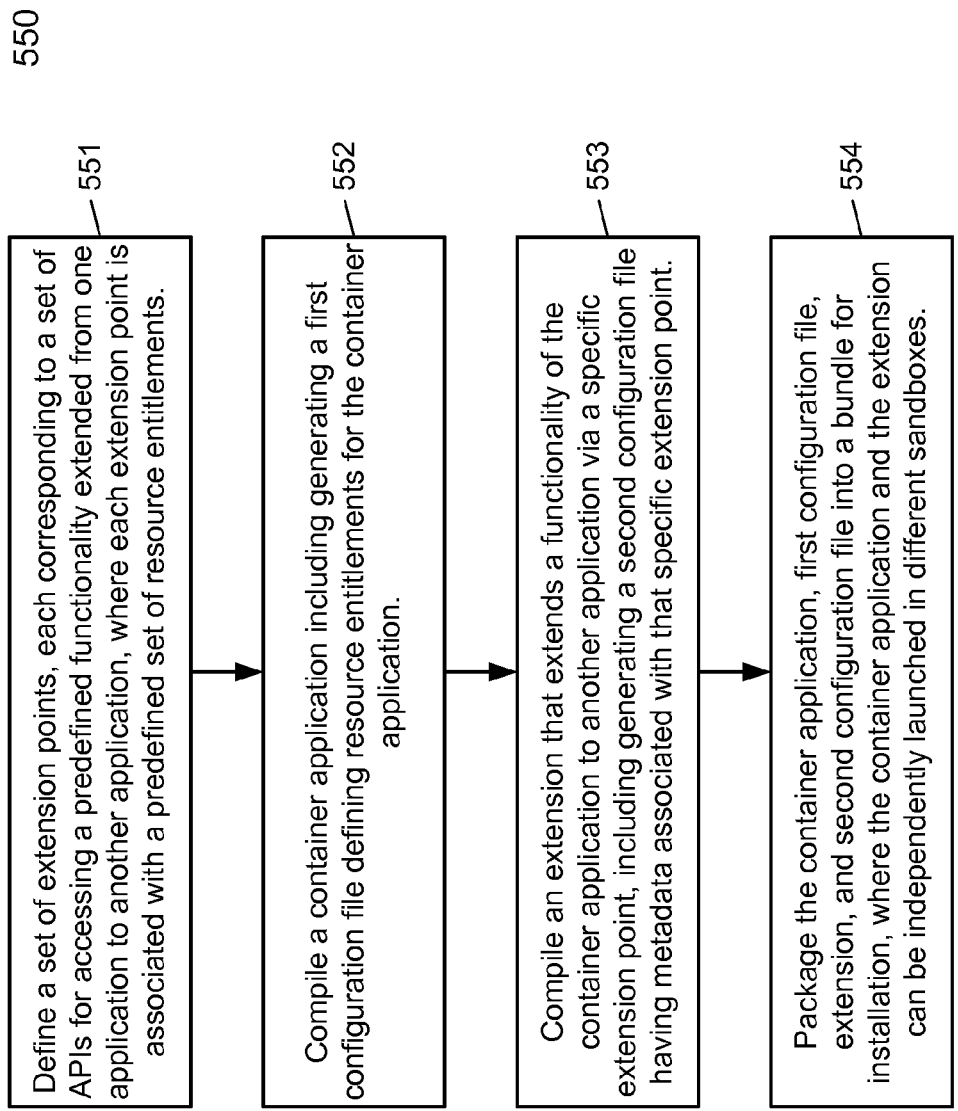
FIG. 5B is a flow diagram illustrating a method for developing extensions for extension points according to one embodiment of the invention.

FIG. 5B is a flow diagram illustrating a method for developing extensions for extension points according to one embodiment of the invention. Method 550 may be performed by processing logic which may include software, hardware, or a combination thereof. For example, method 550 may be performed by SDK 510 of FIG. 5A. Referring to FIG. 5B, at block 551, a set of extension points are defined. Each extension point is associated with a set of APIs to allow one application to access a predefined functionality or obtain a service, which may be extended from another application (e.g., container application) via an extension. At block 552, a container application is compiled including generating a first configuration file defining resource entitlements for the container application. At block 553, an extension that extends a functionality of the container application to another application via a specific extension point is compiled, including generating a second configuration file having metadata associated with that extension point. At block 554, the container application and the extension, as well as their respective configuration files are packaged into a bundle for installation. The container application and the extension can be launched in different sandboxes independently.

FIG. 6A is a block diagram illustrating a system for registering an extension according to one embodiment of the invention. System 600 may be implemented as part of an operating system as described above. Referring to FIG. 6A, an extension framework, such as the one as shown in FIG. 3A, maintains extension registry 350 having described therein a list of extensions that has been installed and registered in the operating system. In one embodiment, extension registry 350 includes multiple entries, each corresponding one of the installed or registered extensions. Each extension entry includes, but is not limited to, extension ID 610, extension provider ID 602, and extension key 603. Extension ID 610 may uniquely identify a type or class of extension services that is defined and agreed upon between an operating system provider and extension providers, such as a UTI. Extension provider ID 611 may uniquely identify an extension provider that provides an extension service, which may be authorized or certified by a predetermined authority. Extension key 612 may represent a particular version or instance of an extension currently installed or registered with the system.

In one embodiment, when an extension is developed, a binary code or executable image of the extension may be encoded with a corresponding extension provider ID and an extension key associated with that particular version or release of the extension. In this example, referring to FIG. 6A, an earlier version of extension 621 includes encoded therein extension provider ID 623 and extension key 625, while a newer version of extension 622 includes extension provider ID 624 and extension key 626, respectively. Extension provider IDs 623-624 may be different if they are provided by different vendors; otherwise, extension provider IDs 623-624 may be identical however, their extension keys 625-626 may be different dependent upon the corresponding versions or instances.

For the purpose of illustration, it is assumed extensions 621-622 are provided by the same extension provider, where extension 621 is an earlier version while extension 622 is a newer version. When extension 621 was installed by installation module 320, a corresponding entry 650 was created, where field 610 stores an extension class ID (e.g., UTI) associated with the type of extension services that extension 621 provides, in this example, content sharing services. Field 611 of entry 650 stores provider ID 623 and field 612 of entry 650 stores extension key 625. When host application 601 attempts to invoke an extension that is associated with entry 650 via the corresponding extension point 602, extension manager 310 may look up in registry 350 to identify any of extensions that are capable of providing the type or class of extension services, for example, based on an extension ID provided by host application 601. In this example, extension entry 650 is identified by matching the extension ID provided by host application 601 against extension IDs 610 of registry 350. Based on provider ID 611 and extension key 612, extension 621 will be identified and launched.

Subsequently, when newer version extension 622 is installed, according to one embodiment, installation module 320 examines the metadata of extension 622, in this example, extension provider ID 623 to ensure that extension 622 is provided by a genuine extension provider that has been certified or authorized by a proper authority. Once the extension provider of extension 622 has been authenticated, installation module 320 replaces extension key 612 (e.g., extension key 625) of entry 650 with newer extension key 626. As a result, in response to a subsequent request for invoking the extension associated with entry 650, newer version of extension 622 will be identified and launched in this example instead of older version extension 621.

Figure 6B:
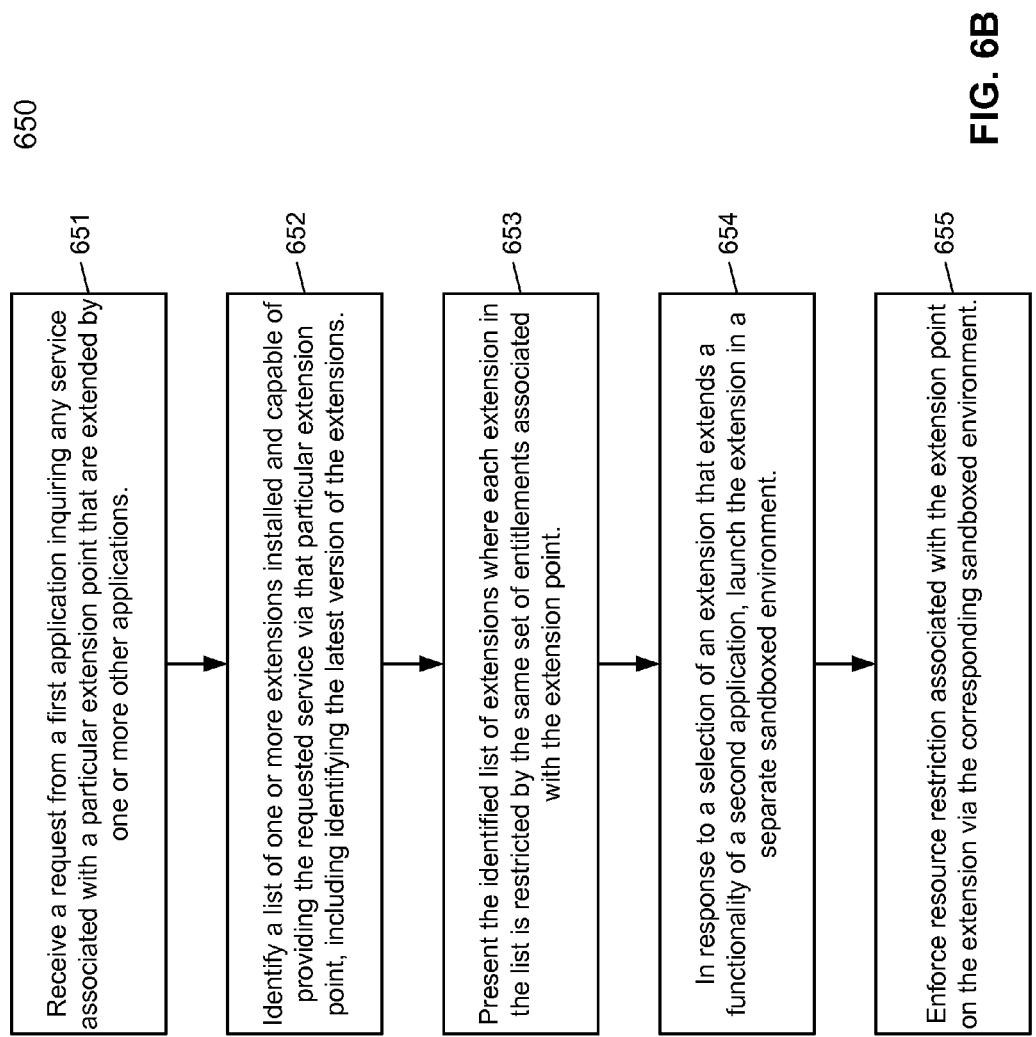
FIG. 6B is a flow diagram illustrating a method for managing extensions via extension points according to one embodiment of the invention.

FIG. 6B is a flow diagram illustrating a method for managing extensions via extension points according to one embodiment of the invention. Method 650 may be performed by processing logic which may include software, hardware, or a combination thereof. For example, method 650 may be performed by system 600 of FIG. 6A. Referring to FIG. 6B, at block 651, processing logic receives a request from a first application inquiring a particular extension service (e.g., identified by a particular UTI) associated with a particular extension point extended by one or more other applications. In response to the request, at block 652, processing logic identifies a list of one or more extensions installed and capable of providing the requested service via that particular extension point, including identifying the latest versions of the extensions. At block 653, the list of identified extensions is presented to a user or to the first application for selecting one of the extensions. At block 654, in response to a selection of an extension that extends a functionality of a second application, processing logic launches the extension in a separate sandboxed environment. Note that the extension can be independently executed without having to launch the second application. At block 655, resource restriction associated with the extension point is enforced on the extension via the corresponding sandboxed environment.

As described above, examples of extensions include, but are not limited to, an extension point for the notification center of operating system 300, an extension point for a third-party keyboard, an extension point for social media, an extension point for services with a user interface (UI), an extension point for a file provider/picker, an extension point for photo editing and/or filtering, an extension point for translation, and an extension point for a file/content finder. Some of these extensions, such as a translation extension point or a filtering extension point, are referred to as action extension points. A filtering extension point can be used to invoke a filtering extension that performs data filtering operations, such as photo filtering operations. According to one embodiment, an action extension may include piece of executable code, such as JavaScript or other scripts, that can be invoked and downloaded from the extension, and executed within the host application to help certain tasks of the host application.

Figure 7A:
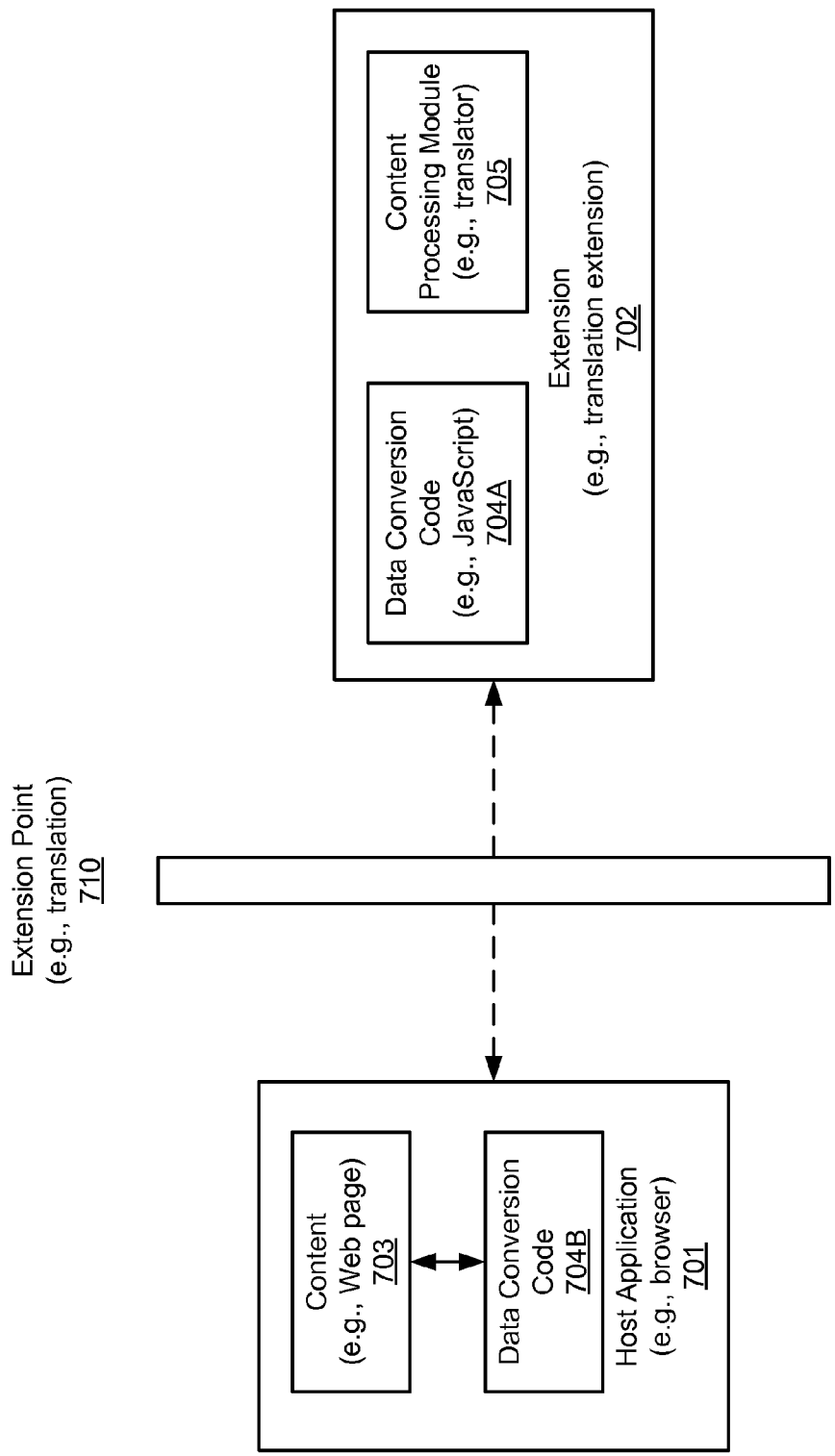
FIG. 7A is a block diagram illustrating an example of an action extension point according to one embodiment of the invention.

FIG. 7A is a block diagram illustrating an example of an action extension point according to one embodiment of the invention. Referring to FIG. 7A, action extension 702, in this example, is a content processing extension that is designed to process content or data for a client such as host application 701 via action extension point 710. Action extension 702 may be developed by a third-party developer that is different than the one providing the operating system. In one embodiment, action extension 702 includes data conversion code 704A in addition to content processing function or module 705. Data conversion code 704A, as a helper agent, may be implemented in a form of executable script, such as JavaScript™.

In one embodiment, when host application 701 requests an action extension service, for the purpose of illustration, a translation extension service, action extension point 710 (e.g., translation extension point) identifies and launches extension 702 to provide translation services. In addition, host application 701 can invoke data conversion code 704A to perform certain data conversion before content processing module 705 performs the actual translation. In one embodiment, host application 701, in this example, a browser application, downloads data conversion code and executed within host application 701 as data conversion code 704B.

Data conversion code 704B, when executed, is configured to parse content 703 to identify which portion of content 703 needs to be processed by content processing module 705. Data conversion code 704B is to package the identified content to a format compatible with extension point 710 and sends the packaged data to extension 802 to be processed by content processing module 705, in this example, a translation module to translate content. In response to the result of the content processing, i.e., translated content, data conversion code 704B is to reformat the translated content to be compatible with content 703 and incorporates the translated content with content 703.

This embodiment can be applied to the situation which host application 701 is a browser application displaying certain content 703 as a hypertext markup language (HTML) page. The browser application can download the JavaScript, i.e., data conversion code 704A and execute it as code 704B. The JavaScript can then process the HTML content 703 to parse and understand the HTML page in order to identify the interested data to be translated. As a result, content processing module does not have to understand the structure of the HTML page. Data conversion code operates as a helper agent for extension 702 (similar to an extension of another extension). Note that data conversion code 704B still has to communicate with extension 702 via extension point 710. Data conversion code 704A is bundled within extension 702, but it is downloaded and executed by host application 701 as code 704B.

Figure 7B:
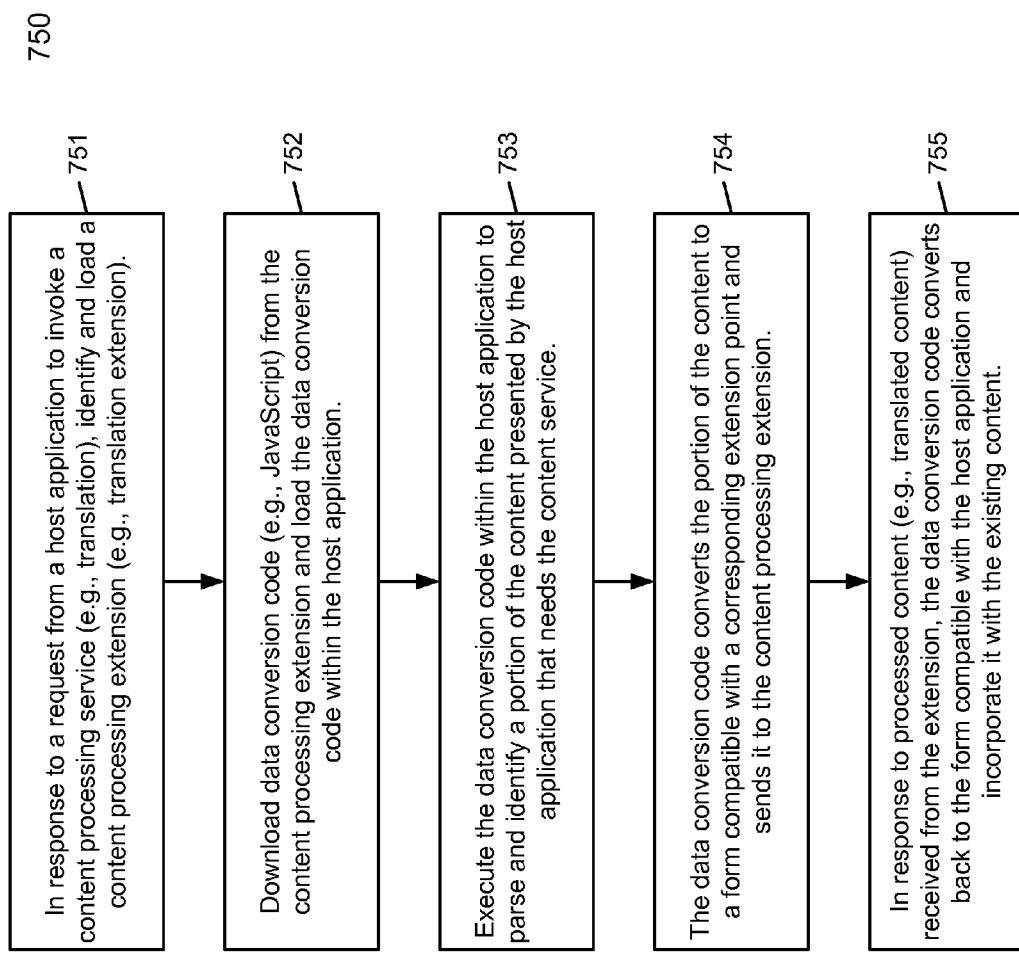
FIG. 7B is a flow diagram illustrating a method of providing an action extension service according to one embodiment of the invention.

FIG. 7B is a flow diagram illustrating a method performed by an action extension point according to one embodiment of the invention. Method 750 may be performed by processing logic which may include software, hardware, or a combination thereof. For example, method 750 may be performed by the system as shown in FIG. 7A. Referring to FIG. 7B, at block 751, in response to a request from a host application to invoke a content processing service (e.g., translation), processing logic identifies and loads a content processing extension. The host application may browser application displaying a Web page and the extension may be a translation extension providing translation services. At block 752, processing logic downloads data conversion code from the extension and loads the data conversion code within the host application. The data conversion code may be an executable script such as JavaScript. At block 753, the host executes the data conversion code to parse and identify a portion of the content presented by the host application. At block 754, the data conversion code converts the identified portion of the content to a form compatible with a corresponding extension point (e.g., translation extension point) and sends the converted data to the extension via the extension point. In response to the processed content (e.g., translated content) received from the extension, the data conversion code is to convert the data back to the form compatible with the host application and incorporate the processed content with the existing content of the host application.

Figure 8A:
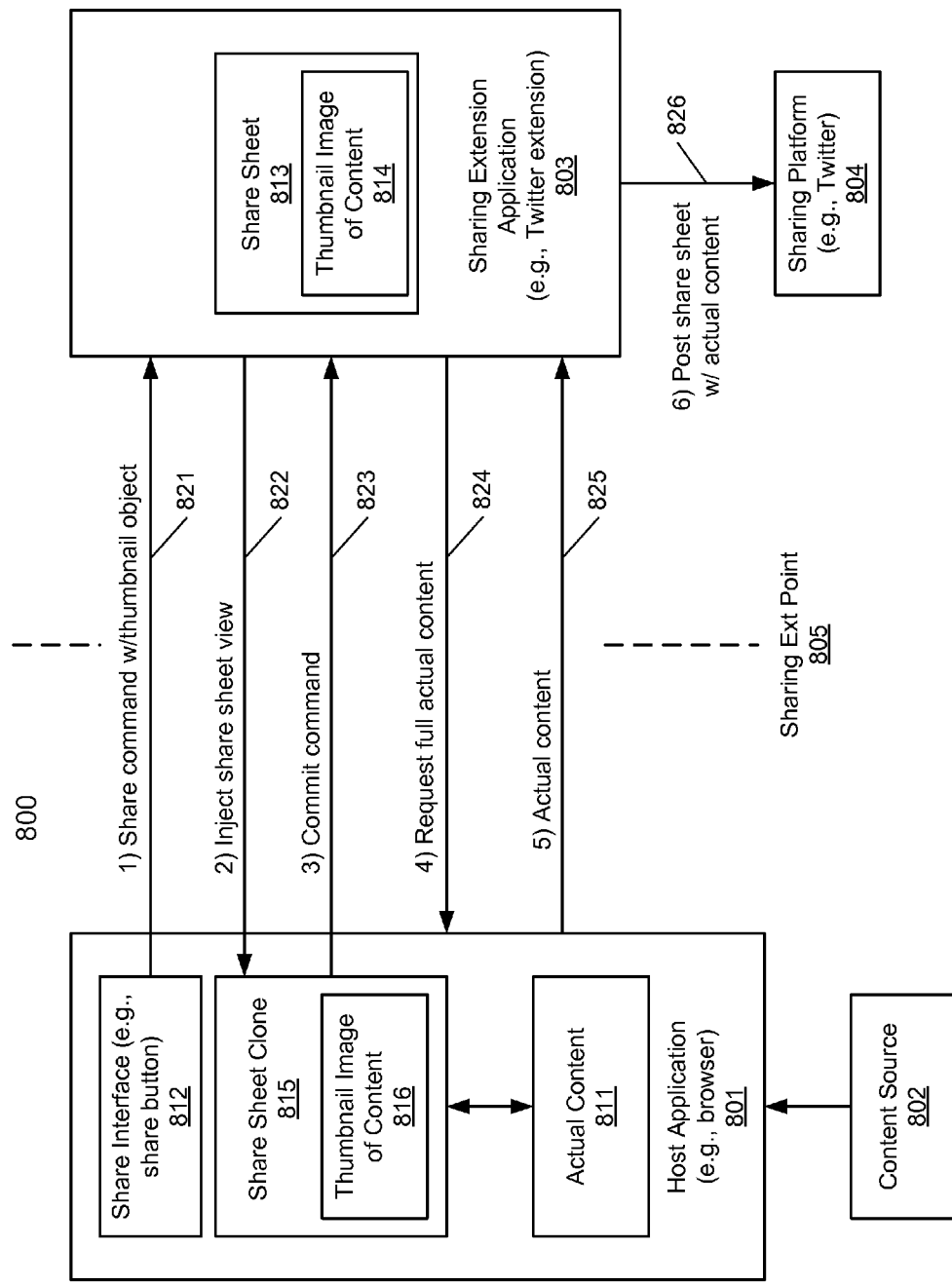
FIG. 8A is a block diagram illustrating a sharing extension point for providing content sharing services according to one embodiment of the invention.

FIG. 8A is a block diagram illustrating a sharing extension point for providing content sharing services according to one embodiment of the invention. System 800 may be implemented as part of any of the extension frameworks described above. Referring to FIG. 8A, in this example, host application 801 displays or renders content 811, which may be provided by content source 802 such as a Web site. After viewing content 811, a user may want to share content 811 with his/her friends by activating share user interface 812. The activation of share user interface 812 sends a share command through sharing extension point 805 to sharing extension 803 via path 821. The share command transmitted over path 821 may further includes a data object having a reduced resolution image (e.g., thumbnail image) of content 811. In this example, it is assumed that sharing extension 803 has been properly installed, registered, identified, and selected using some of the techniques described above. Host application 801 and sharing extension 803 may communicate with each other via an IPC framework provided by sharing extension point 805 as described above.

In response to the share command received via path 821, according to one embodiment, sharing extension 803 creates share sheet 813 having a thumbnail image of content 811 presented therein that is extracted from the received data object. Share sheet 813 is then injected into host application 801 via path 822 and displayed as share sheet clone 815 having a thumbnail image 816 representing content 811. The share sheet clone may be injected via a remote view bridge connection between the sharing extension 803 and host application 801. Once the user views share sheet clone 815 and commits to share the content presented by thumbnail 816, a commit command is transmitted to sharing extension 803 via path 823. In response to the commit command, sharing extension 803 transmits a request for actual content 811 via path 824. Once sharing extension 803 receives the actual content from host application 801 via path 825, it replaces the thumbnail image 814 with the actual content and posts share sheet 813 at content sharing website or platform 804 via path 826. Note that sharing extension point can be used to extend sharing services to social communities (e.g., Twitter™, Facebook™, LinkedIn™, etc.) and/or non-social environments (e.g., AirDrop™, email, etc.).

Figure 8B:
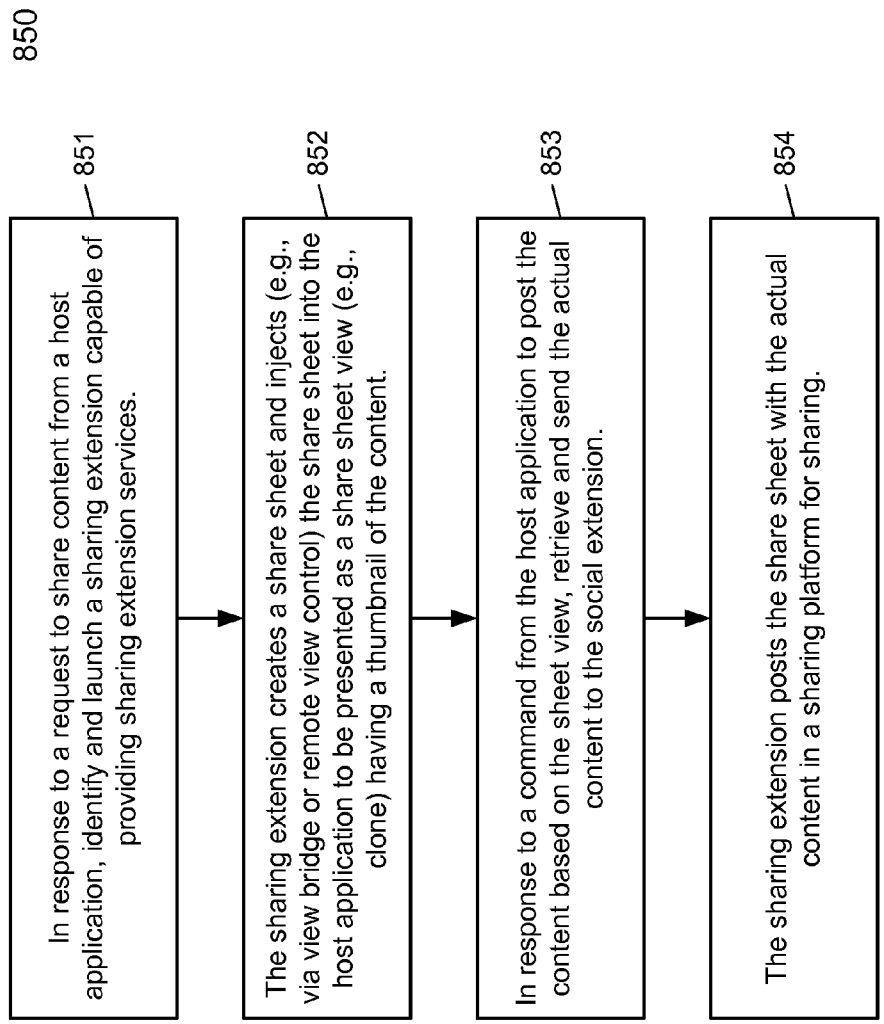
FIG. 8B is a flow diagram illustrating a method for sharing content using a sharing extension according one embodiment of the invention.

FIG. 8B is a flow diagram illustrating a method for sharing content using a sharing extension according one embodiment of the invention. Method 850 may be performed by processing logic which may include software, hardware, or a combination thereof. For example, method 850 may be performed by system 800 of FIG. 8A. Referring to FIG. 8B, at block 851, in response to a request from a host application for sharing content, processing logic identifies and launches a sharing extension that is capable of providing content share services. At block 852, the sharing extension creates a share sheet having a reduced resolution image (e.g., thumbnail, icon) of the content to be shared. The share sheet is injected into the host application as a share sheet view, for example, using a remote view bridge connection. At block 853, in response to a commit command from the host application, the sharing extension requests and receives the actual content from the host application, and at block 854, the share sheet with the actual content is posted on a content sharing website.

Figure 9:
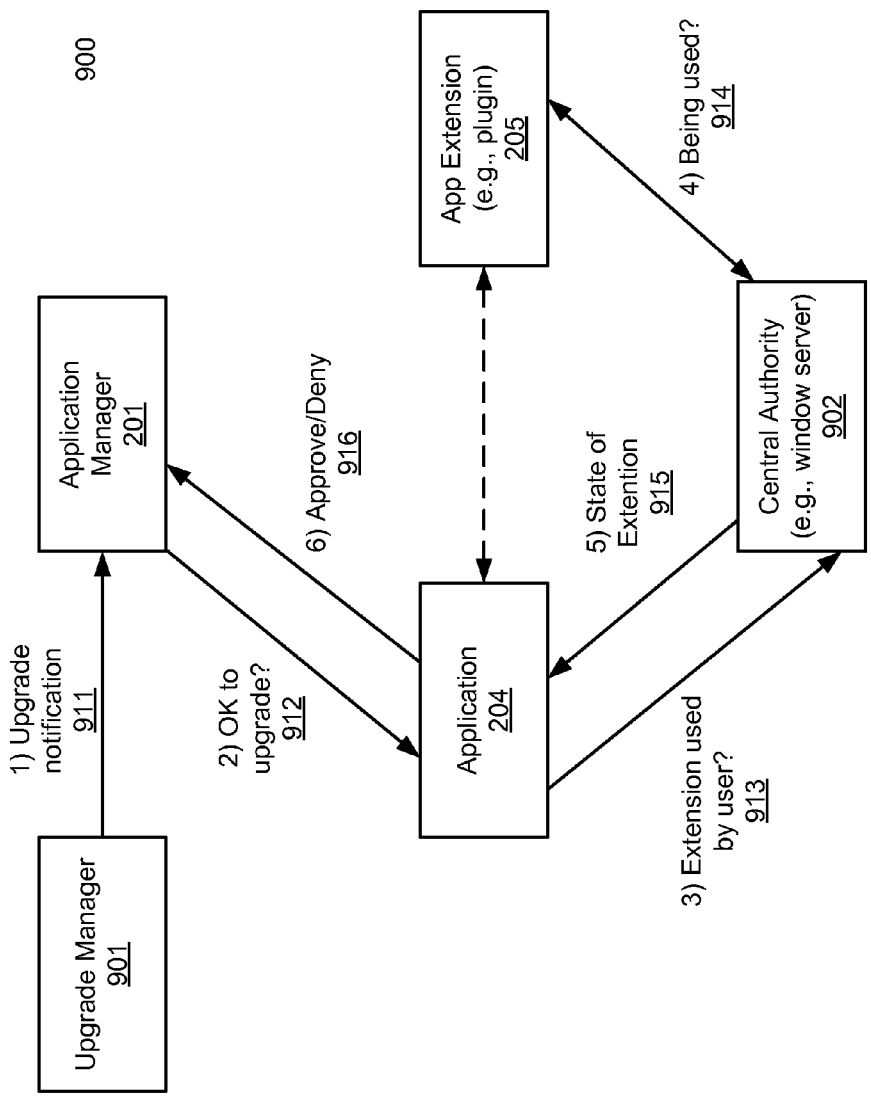
FIG. 9 is a block diagram illustrating a process for handling termination of an application according to one embodiment of the invention.

FIG. 9 is a block diagram illustrating a process for handling termination of an application according to one embodiment of the invention. System 900 may be implemented as part of any system described above. Referring to FIG. 9, when application manager 201 receives a request for upgrading application 204 from upgrade manager or alternatively a request for terminating application 204 via path 911, application manager 201 communicates with application 204 via path 912 to inquire whether it is safe to terminate application 204. In response to the inquiry, application 204 communicates via path 913 with central authority 902, such as a window server, to determine whether application extension 205 is currently being used by a user. Central authority 902 may determine via path 914 whether application extension 205 is in the foreground, as one way to find out whether the user is currently using a user interface provided by application extension 205. Central authority 902 then transmits the operating state of application extension back to application 204 via path 915, which in turn informs application manager 201 via path 916. For example, if it is determined a user is currently utilizing the user interface application extension 205, application manager 201 may defer terminating application 204 in order not to disrupt the user. Alternatively, application 204 may directly communicate with application extension 205 via the IPC framework to determine whether the user is currently using application extension 205.

According to another embodiment, application extensions of certain applications can be used by a centralized application or a control center to access, via the application extensions, functionalities of the associated applications. That is, the centralized application or control center serves as a centralized entry point to a variety of applications without requiring the user to individually launch the corresponding applications. In addition, when an application extension has been installed by the operating system, an option is provided to the user to activate/enable or deactivate/disable the application extension. For example, an installed application extension of an installed application for an application control center (e.g., a notification center) of an operating system can be displayed within a user interface of the application control center as a hosting application. The user interface of the application control center may display an enable/disable option (e.g., a switch graphical representation such as an icon) to allow the user to enable or disable the installed application extension. The application extension is accessible from the application control center (e.g., to utilize functionalities of the associated installed application) only if the application extension has been enabled; otherwise, the user has to use the installed application associated with the application extension.

Figure 10:
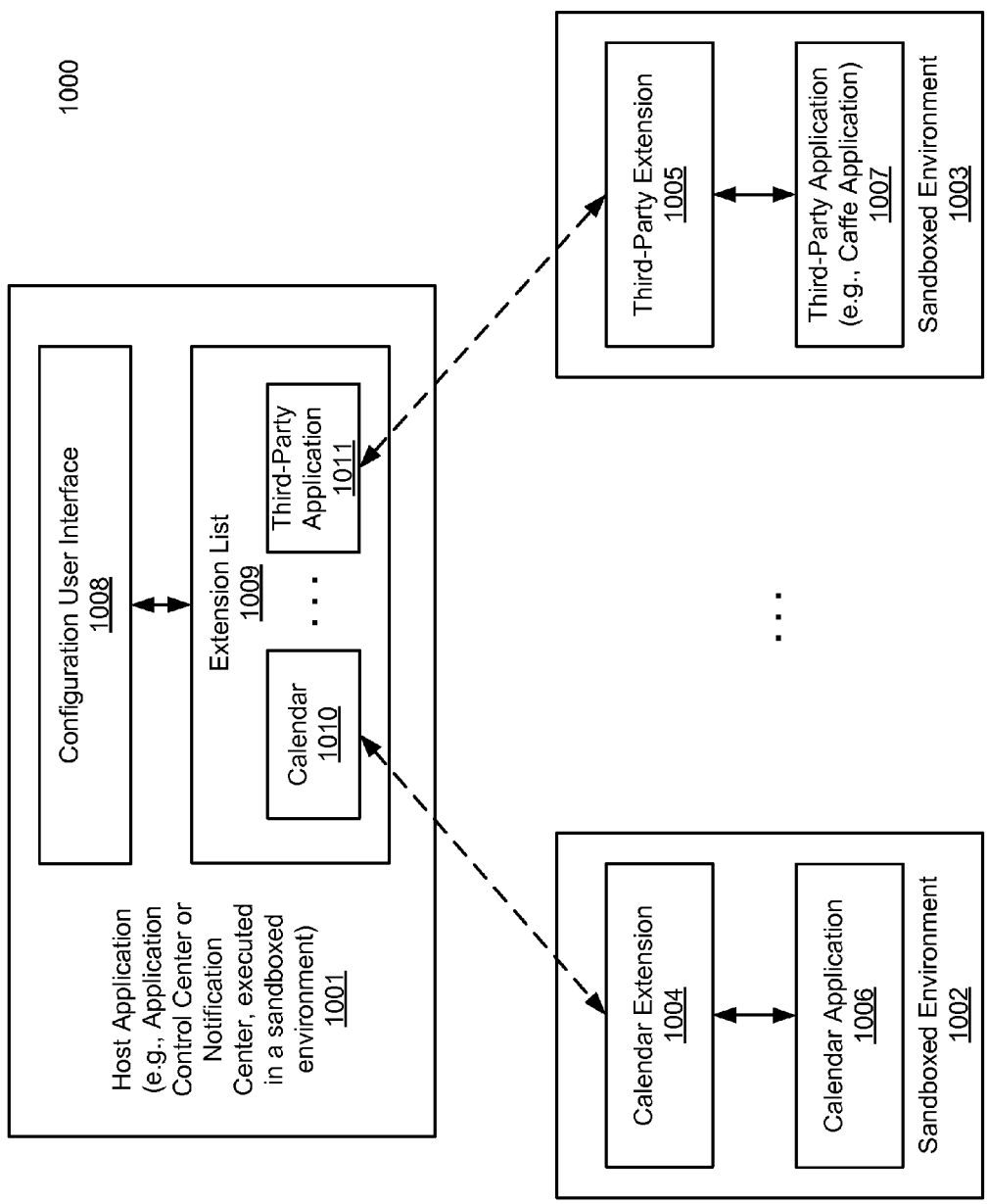
FIG. 10 is a block diagram illustrating a system for accessing applications via their respective extensions according to one embodiment of the invention.

FIG. 10 is a block diagram illustrating a system for accessing applications via their respective extensions according to one embodiment of the invention. Referring to FIG. 10, host application 1001 is configured to host a list 1009 of application extensions 1004-1005 of applications 1006-1007 that are specifically designed for host application 1001, which are presented by stubs or graphical representations (e.g., icons) 1010-1011, respectively. Host application 1001 may be a notification center or a control center of an operating system. Application extensions 1004-1005 may be launched and executed in different sandboxed environments 1002-1003 than the one executing host application 1001. Note that application extensions 1004-1005 may also be executed in different sandboxed environments than the ones in which their associated applications 1006-1007 are executed. From extension list 1009 as a centralized entry point, a user can access the functionalities of applications 1006-1007 via their respective extensions 1004-1005. In one embodiment, host application 1001 includes a configuration interface 1008 to allow a user to enable or disable (e.g., opt-in or opt-out) any one of the application extensions 1010-1011 individually.

Figure 11B:
FIGS. 11A-11B are screenshots illustrating an example of a graphical user interface of an application according to one embodiment of the invention.
Figure 11A:
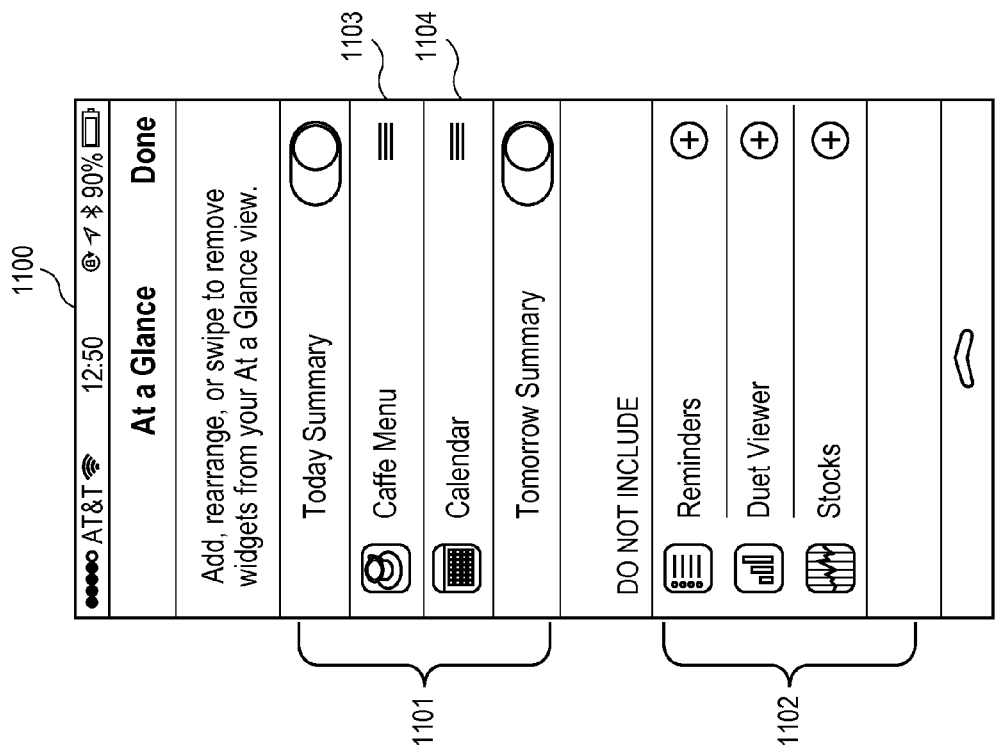

FIGS. 11A and 11B are screenshots illustrating an example of a graphical user interface of an application according to one embodiment of the invention. Referring to FIGS. 11A and 11B, the screenshots may be presented by system 1000 of FIG. 10. GUI 1100 represents a user interface of a host application, such as, host application 1001 of FIG. 10. In this example, application 1100 represents an application control center of an operating system, such as the notification center of iOS from Apple Inc. Application 1100 includes multiple stubs or entry points to a variety of other applications. In this example, the GUI includes section 5 listing the activated entry points of other applications and section 1102 listing the deactivated entry points of other applications. Each of the stubs or entry points listed in section 1101 can be deactivated by switching a corresponding switching icon, which will move the graphical representation of the entry point from section 1101 to section 1102. Similarly, each of the entry points in section 1102 can be activated and moved to section 1101.

In one embodiment, at least some of the entry points in sections 1101-1102 may be application extensions extended from the third-party applications and some may be associated with the applications or services provided by the operating system. For example, application 1103 may be a third-party application (e.g., application 1007 of FIG. 10), while application 1104 may be a built-in application or service provided by the operating system (e.g., application 1006 of FIG. 10). From the GUI of application 1101 as shown in FIG. 11A, a user can access another application via its activated entry point. For example, the user can click graphical representation 1103 of FIG. 11A representing a plugin of another application to access functionalities of that particular application as shown in FIG. 11B. As a result, the user can access multiple applications from the notification center in this example. The user can also individually access those applications by launching the individual applications in a conventional manner.

Figure 12A:
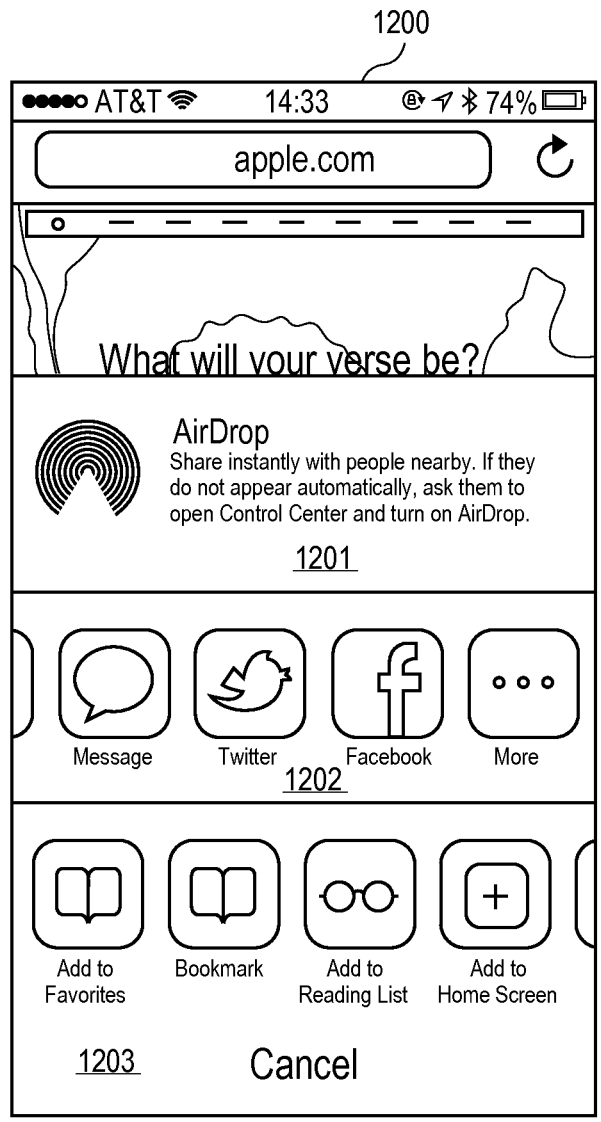

FIGS. 12A-12C are screenshots illustrating an example of a graphical user interface of an application according to one embodiment of the invention. Referring to FIGS. 12A-12C, the screenshots may be presented by system 1000 of FIG. 10. In this example, GUI 1200 may be presented by host application 1201 to share sheets to appear in other applications listed in row 1202 and services listed in row 1203. The graphical representations, in this example icons, listed in row 1202 may include some application extensions from other applications, such as Twitter™ and Facebook™. Each of those extensions or services in rows 1202 and 1203 can be individually activated or deactivated. For example, when a user click on the "More" icon in row 1202 and row 1203, a configuration page is displayed to allow the user to individually configure any one of the listed application extensions or services as shown in FIG. 12B and FIG. 12C, respectively.

Figure 13:
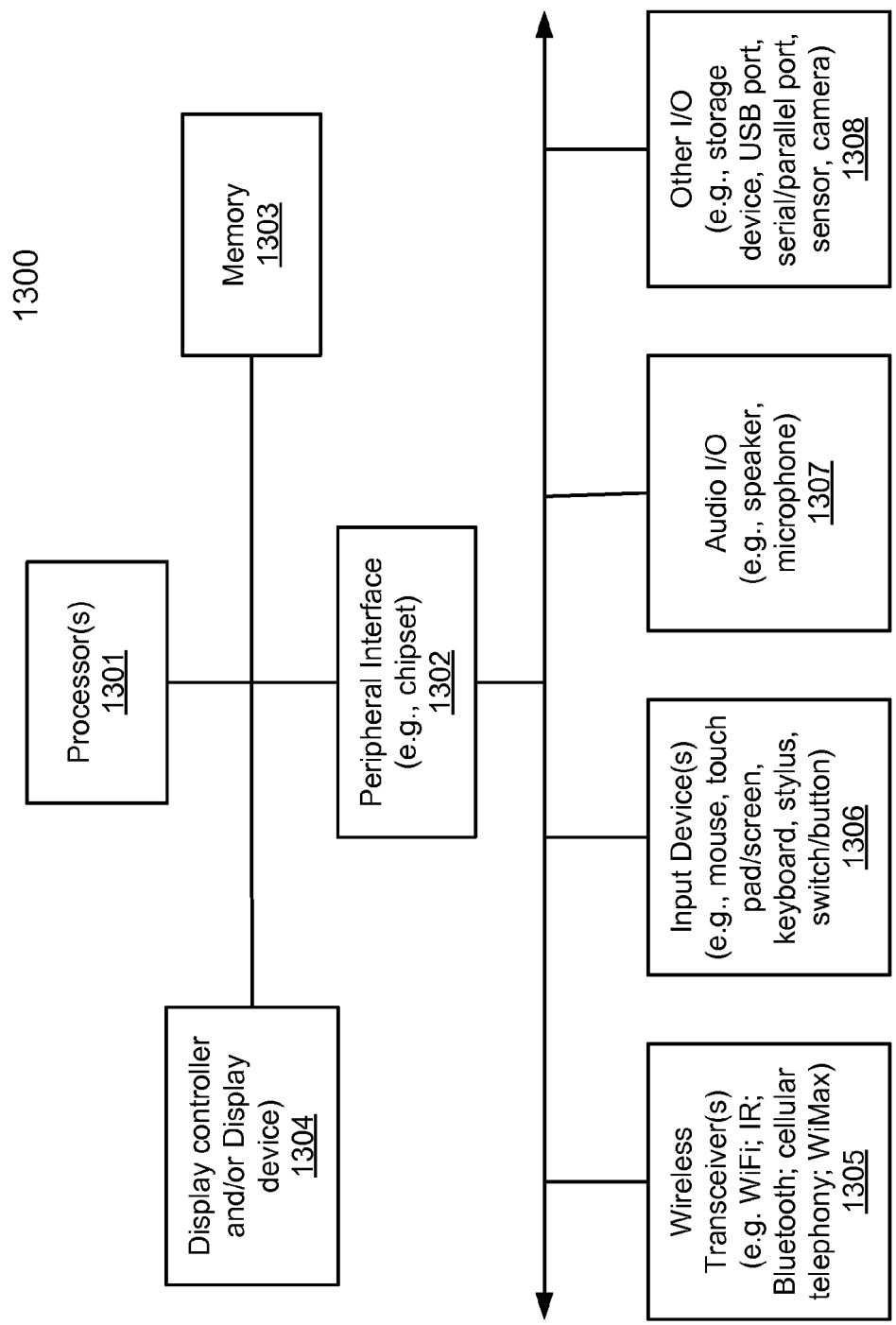
FIG. 13 is a block diagram illustrating an example of a data processing system which may be used with one embodiment of the invention.

FIG. 13 is a block diagram illustrating an example of a data processing system which may be used with one embodiment of the invention. For example, system 1300 may represents any of data processing systems described above performing any of the processes or methods described above. For example, system 1300 may represent systems as described above. System 1300 may represent a desktop (e.g., iMac™ available from Apple Inc. of Cupertino, Calif.), a laptop (e.g., MacBook™), a tablet (e.g., iPad™), a server, a mobile phone (e.g., iPhone™), a media player (e.g., iPod™ or iPod Touch™), a personal digital assistant (PDA), a personal communicator, a gaming device, a network router or hub, a wireless access point (AP) or repeater, a set-top box, or a combination thereof.

Referring to FIG. 13, in one embodiment, system 1300 includes processor 1301 and peripheral interface 1302, also referred to herein as a chipset, to couple various components to processor 1301 including memory 1303 and devices 1305-1308 via a bus or an interconnect. Processor 1301 may represent a single processor or multiple processors with a single processor core or multiple processor cores included therein. Processor 1301 may represent one or more general-purpose processors such as a microprocessor, a central processing unit (CPU), or the like. More particularly, processor 1301 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1301 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 1301 is configured to execute instructions for performing the operations and steps discussed herein.

Peripheral interface 1302 may include memory control hub (MCH) and input output control hub (ICH). Peripheral interface 1302 may include a memory controller (not shown) that communicates with a memory 1303. Peripheral interface 1302 may also include a graphics interface that communicates with graphics subsystem 1304, which may include a display controller and/or a display device. Peripheral interface 1302 may communicate with graphics device 1304 via an accelerated graphics port (AGP), a peripheral component interconnect (PCI) express bus, or other types of interconnects.

An MCH is sometimes referred to as a Northbridge and an ICH is sometimes referred to as a Southbridge. As used herein, the terms MCH, ICH, Northbridge and Southbridge are intended to be interpreted broadly to cover various chips who functions include passing interrupt signals toward a processor. In some embodiments, the MCH may be integrated with processor 1301. In such a configuration, peripheral interface 1302 operates as an interface chip performing some functions of the MCH and ICH. Furthermore, a graphics accelerator may be integrated within the MCH or processor 1301.

Memory 1303 may include one or more volatile storage (or memory) devices such as random access memory (RAM), dynamic RAM (DRAM), synchronous DRAM (SDRAM), static RAM (SRAM), or other types of storage devices. Memory 1303 may store information including sequences of instructions that are executed by processor 1301, or any other device. For example, executable code and/or data of a variety of operating systems, device drivers, firmware (e.g., input output basic system or BIOS), and/or applications can be loaded in memory 1303 and executed by processor 1301. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 1302 may provide an interface to IO devices such as devices 1305-1308, including wireless transceiver(s) 1305, input device(s) 1306, audio IO device(s) 1307, and other IO devices 1308. Wireless transceiver 1305 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 1306 may include a mouse, a touch pad, a touch sensitive screen (which may be integrated with display device 1304), a pointer device such as a stylus, and/or a keyboard (e.g., physical keyboard or a virtual keyboard displayed as part of a touch sensitive screen). For example, input device 1306 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 1307 may include a speaker and/or a microphone to facilitate voice-enabled functions, such as voice recognition, voice replication, digital recording, and/or telephony functions. Other optional devices 1308 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 1308 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 13 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
launching, by an application manager of an operating system running within a data processing system, an application in a first sandboxed environment based on a first security profile associated with the application;
receiving a request from the application for accessing a function of an application extension that is associated with the application;
launching, by the application manager, the application extension in a second sandboxed environment based on a second security profile associated with the application extension;
facilitating, via an inter-process call (IPC) framework, communications between the application running within the first sandboxed environment and the application extension running within the second sandboxed environment, in response to determining that the application extension is authorized to communicate with the application and the application is authorized to communicate with the application extension; and
individually enforcing security and managing resources of the application and the application extension in the first and second sandboxed environments based on the first and second security profiles, respectively, wherein the second security profile specifies resources that are different than the first security profile.

2. The method of claim 1, wherein the first security profile includes information describing a first set of constraints that limits accessing resources of the data processing system from the application, wherein the second security profile includes information describing a second set of constraints that limits accessing resources of the data processing system from the application extension.

3. The method of claim 2, wherein the resources limited by the second set of constraints are fewer than the resources limited by the first set of constraints.

4. The method of claim 1, wherein the application and the application extension are provided by different product providers.

5. The method of claim 1, wherein launching the application extension environment comprises:
examining the first security profile of the application to determine whether the application extension is authorized to communicate with the application, wherein the application extension is launched if the first security profile allows; and examining the second security profile of the application extension to determine whether the application is authorized to communicate with the application extension.

6. The method of claim 1, wherein facilitating communications between the application and the application extension comprises:

in response to first graphical user interface (GUI) content rendered by the application extension, transmitting data representing the first GUI content from the application extension to the application via the IPC framework;

rendering at the application a second GUI content based on the data received from the application extension; and presenting the second GUI content at the application without requiring the application extension running within the same process address space as of the application.

7. The method of claim 6, further comprising synchronizing content updates between the application and the application extension via the IPC framework.

8. The method of claim 1, further comprising:

in response to an upgrade notification of at least one of the application and the application extension, determining whether the application extension is being accessed by a user; and enabling an upgrade process of the at least one of the application and the application extension running at a background if it is determined no user is currently accessing the application extension.

9. The method of claim 8, wherein determining whether the application extension is being accessed by a user comprises determining whether the application extension is running at a foreground of the operating system.

10. The method of claim 1, further comprising:

installing the application extension prior to launching of the application extension, wherein the installed application extension is deactivated by default;

presenting a user notification to a user indicating that the application extension has been installed;

displaying an option as part of the user notification to allow the user to activate the application extension; and in response to a request received from the user for activating the application extension, associating the application extension with the application to enable the application to invoke the application extension.

11. A non-transitory computer-readable storage medium having instructions stored therein, which when executed by a computer, cause the computer to perform a method, the method comprising:

launching, by an application manager of an operating system running within a data processing system, an application in a first sandboxed environment based on a first security profile associated with the application;

receiving a request from the application for accessing a function of an application extension that is associated with the application;

launching, by the application manager, the application extension in a second sandboxed environment based on a second security profile associated with the application extension;

facilitating, via an inter-process call (IPC) framework, communications between the application running within the first sandboxed environment and the application extension running within the second sandboxed environment, in response to determining that the application extension is authorized to communicate with the application and the application is authorized to communicate with the application extension; and individually enforcing security and managing resources of the application and the application extension in the first and second sandboxed environments based on the first and second security profiles, respectively, wherein the second security profile specifies resources that are different than the first security profile.

12. The non-transitory computer-readable storage medium of claim 11, wherein the first security profile includes information describing a first set of constraints that limits accessing resources of the data processing system from the application, wherein the second security profile includes information describing a second set of constraints that limits accessing resources of the data processing system from the application extension.

13. The non-transitory computer-readable storage medium of claim 12, wherein the resources limited by the second set of constraints are fewer than the resources limited by the first set of constraints.

14. The non-transitory computer-readable storage medium of claim 11, wherein the application and the application extension are provided by different product providers.

15. A data processing system, comprising:

a processor; and a memory coupled to the processor for storing instructions, which when executed from the memory, cause the processor to launch an application in a first sandboxed environment based on a first security profile associated with the application, receive a request from the application for accessing a function of an application extension that is associated with the application, launch the application extension in a second sandboxed environment based on a second security profile associated with the application extension, facilitate via an inter-process call (IPC) framework, communications between the application running within the first sandboxed environment and the application extension running within the second sandboxed environment, in response to determining that the application extension is authorized to communicate with the application and the application is authorized to communicate with the application extension, and individually enforce security and manage resources of the application and the application extension in the first and second sandboxed environments based on the first and second security profiles, respectively, wherein the second security profile specifies resources that are different than the first security profile.

16. The system of claim 15, wherein the first security profile includes information describing a first set of constraints that limits accessing resources of the data processing system from the application, wherein the second security profile includes information describing a second set of constraints that limits accessing resources of the data processing system from the application extension.

17. The system of claim 16, wherein the resources limited by the second set of constraints are fewer than the resources limited by the first set of constraints.

18. The system of claim 15, wherein the application and the application extension are provided by different product providers.

19. A computer-implemented method, comprising:
launching, by an application manager of an operating system running within a data processing system, an application in a first process address space, the application having an associated first security profile;
in response to a request received from the application for invoking an application extension associated with the application, launching, by the application manager, the application extension in a second process address space, the application extension having an associated second security profile; and
in response to determining that the application extension is authorized to communicate with the application and the application is authorized to communicate with the application extension, synchronizing via an inter-process call (IPC) mechanism graphical user interface (GUI) content between the application and the application extension running within the first and second process address spaces, respectively, without requiring the application extension to be executed within the first process address space.

20. The method of claim 19, wherein the first process address space is associated with a first security profile that defines a first set of resources that the application is limited to access, and wherein the second process space is associated with a second security profile that defines a second set of resources that the application extension is limited to access.

21. The method of claim 20, wherein the second set of resources are fewer than the first set of resources.

22. The method of claim 19, wherein the application extension is a plugin program associated with the application.

23. A computer-implemented method, comprising:
receiving, by an application manager of an operating system within a data processing system, a request for upgrading an application executed as a first sandboxed process of the operating system, the application associated with a plugin that is executed as a second sandboxed process of the operating system;
requesting, by the application manager, from the application, an indication of whether the plugin is in use by a user;
in response to the request from the application and in response to determining that the plugin is authorized to communicate with the application and the application is authorized to communicate with the plugin, determining by the application, via inter-process communication (IPC) between the application and the plugin, whether the plugin is being used by a user of the data processing system;
allowing upgrading the application if the plugin is not being used by the user; and
deferring upgrading the application if the plugin is being used by the user.

24. The method of claim 23, wherein determining whether the plugin is being used by a user comprises determining whether the plugin is operating in a foreground.

25. The method of claim 24, wherein the first process is executed in a first process address space and the second process is executed in a second process address space, and wherein the application communicates with the plugin via an inter-process call (IPC) framework.

* * * * *